(12) United States Patent
Lofley, Sr. et al.

(10) Patent No.: US 8,434,802 B2
(45) Date of Patent: May 7, 2013

(54) EXTENSION TOOL

(76) Inventors: Robert G. Lofley, Sr., Seffner, FL (US);
Robert G. Lofley, Jr., Tampa, FL (US)

(*) Notice: Subject to any disclaimer, the term of this patent is extended or adjusted under 35 U.S.C. 154(b) by 382 days.

(21) Appl. No.: 12/589,856

(22) Filed: Oct. 29, 2009

(65) Prior Publication Data
US 2010/0109357 A1 May 6, 2010

Related U.S. Application Data

(60) Provisional application No. 61/197,908, filed on Oct. 30, 2008, provisional application No. 61/271,116, filed on Jul. 17, 2009.

(51) Int. Cl.
*B66F 19/00* (2006.01)
(52) U.S. Cl.
USPC .................. 294/210; 294/175; 403/378
(58) Field of Classification Search .............. 294/24, 294/210, 175; 403/377, 378, 379.5, 379.6, 403/379.1–379.4
See application file for complete search history.

(56) References Cited

U.S. PATENT DOCUMENTS

| | | | |
|---|---|---|---|
| 684,858 A | 10/1901 | Pearson | |
| 872,271 A | 11/1907 | Benet | |
| 918,579 A | 4/1909 | Murch | |
| 1,365,851 A | 1/1921 | Reynolds | |
| 1,726,372 A | 8/1929 | Stoll | |
| 4,076,213 A | 2/1978 | Payson | |
| 4,577,837 A | 3/1986 | Berg et al. | |
| 4,646,378 A | 3/1987 | Borden | |
| 4,715,252 A | 12/1987 | Pella | |
| 4,918,896 A * | 4/1990 | Wiese | 52/632 |
| 4,991,469 A | 2/1991 | Pella | |
| 5,433,551 A | 7/1995 | Gordon | |
| 5,481,950 A * | 1/1996 | Browning | 81/488 |
| 5,625,923 A | 5/1997 | Huang | |
| 5,811,688 A | 9/1998 | Marsh et al. | |

OTHER PUBLICATIONS www.alltackle.com/rupp_big_riggs_ruppriggers.htm.
www.paint-and-supplies.hardwarestore.com/47-345-extension-poles/z-pro-telescoping-extension-pole-453423.espx.

(Continued)

*Primary Examiner* — Saul Rodriguez
*Assistant Examiner* — Gabriela Puig
(74) *Attorney, Agent, or Firm* — Frijouf, Rust & Pyle, P.A.

(57) ABSTRACT

An extension tool is disclosed and comprises a first pole and a second pole. The second pole is slidably received within the first pole. The second pole has a plurality of apertures. A pin lever is pivotably mounted relative to the first pole. A pin slidably engages within the pin lever. The pin lever is released for inserting the pin into the plurality of apertures of the second pole for terminating displacement of the first pole relative to the second pole. The pin lever is depressed for removing the pin from the plurality of apertures of the second pole for permitting displacement of the first pole relative to the second pole. A device, tool or support may be secured to the second ends of the second pole. In one embodiment, a claw is secured to the second end of the second pole for engaging either a knuckle coupler or a wheel brake of a railroad car.

17 Claims, 17 Drawing Sheets

U.S. PATENT DOCUMENTS

| | | | |
|---|---|---|---|
| 6,182,539 B1 | 2/2001 | Webster | |
| 6,213,672 B1 * | 4/2001 | Varga | 403/109.2 |
| 6,254,305 B1 | 7/2001 | Taylor | |
| 6,347,777 B1 * | 2/2002 | Webber et al. | 248/354.1 |
| 6,461,074 B2 | 10/2002 | Taylor | |
| 6,682,209 B2 * | 1/2004 | Drake et al. | 362/403 |
| 6,951,185 B1 | 10/2005 | Wiese | |
| 7,025,015 B2 * | 4/2006 | Wilcox et al. | 114/255 |
| 7,040,832 B2 * | 5/2006 | Hsieh | 403/109.3 |
| 7,097,380 B2 * | 8/2006 | Lee | 403/109.2 |
| 7,111,574 B2 | 9/2006 | Slatter | |
| 7,293,934 B1 | 11/2007 | Huang | |
| 7,311,061 B1 | 12/2007 | Wiese | |
| D663,193 S | 7/2012 | Lofley, Sr. et al. | |
| 2004/0016385 A1 | 1/2004 | Wilcox et al. | |
| 2006/0062632 A1 * | 3/2006 | Jang | 403/109.6 |

OTHER PUBLICATIONS

U.S. Appl. No. 12/589,856, Robert G. Lofley, Sr., et al.
U.S. Appl. No. 12/927,952, Robert G. Lofley, Sr., et al.
U.S. Appl. No. 13/374,200, Robert G. Lofley, Sr., et al.
U.S. Appl. No. 13/397,389, Robert G. Lofley, Sr., et al.
U.S. Appl. No. 13/616,293, Robert G. Lofley, Sr., et al.
U.S. Appl. No. 61/633,026, Robert G. Lofley, Sr., et al.
U.S. Appl. No. 29/414,965, Robert G. Lofley, Sr., et al.
U.S. Appl. No. 61/459,635, Robert G. Lofley, Sr., et al.
U.S. Appl. No. 61/271,116, Robert G. Lofley, Sr., et al.
U.S. Appl. No. 61/197,908, Robert G. Lofley, Sr., et al.
U.S. Appl. No. 13/757,482, Robert G. Lofley, Sr., et al.
U.S. Appl. No. 29/439,382, Robert G. Lofley, Sr., et al.
U.S. Appl. No. 12/567,135, Robert G. Lofley, Sr., et al.

\* cited by examiner

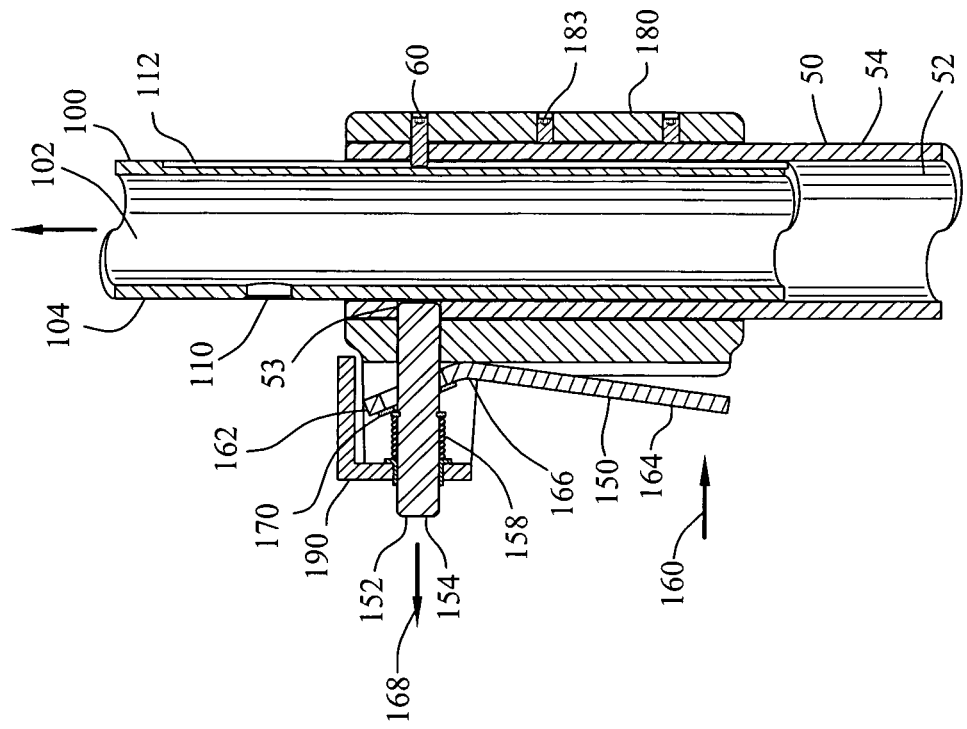
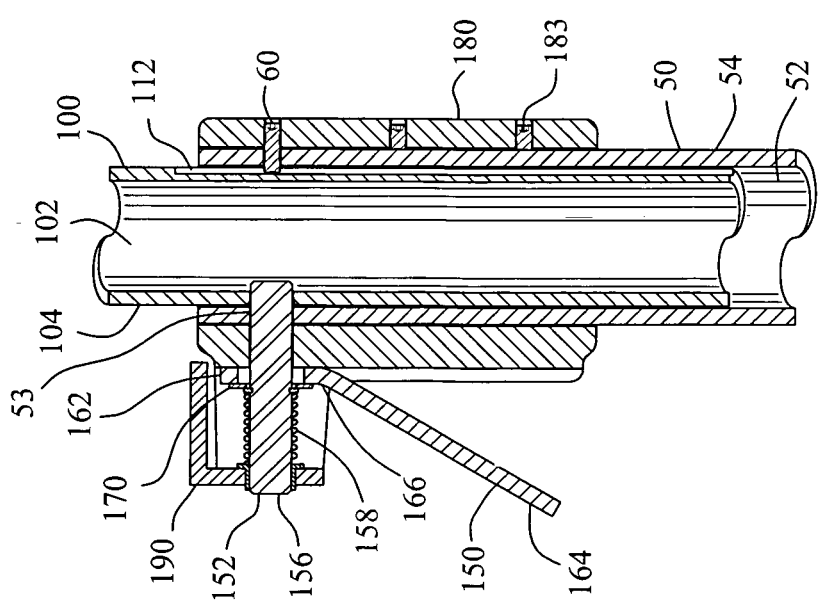
FIG. 11
FIG. 10

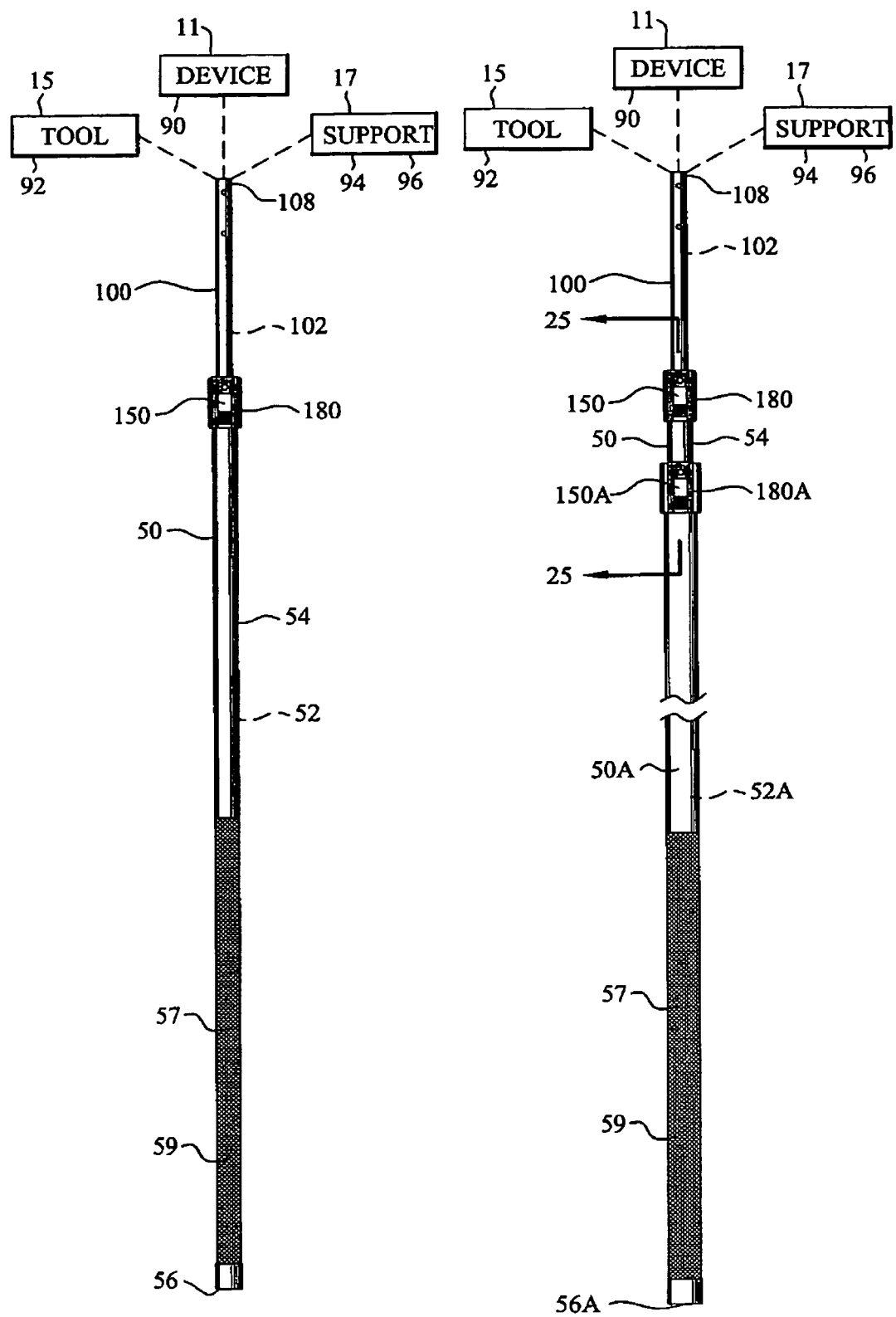

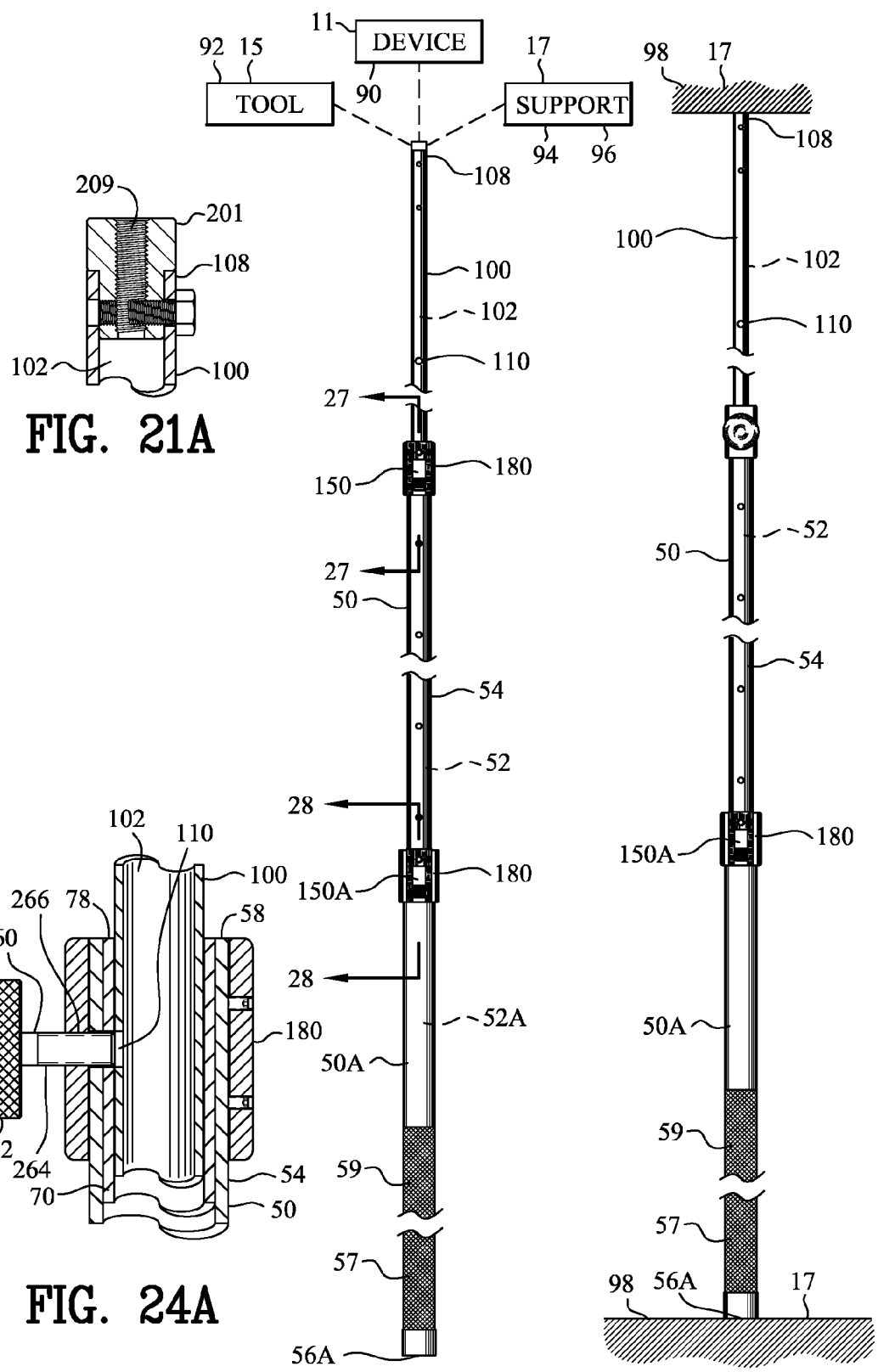

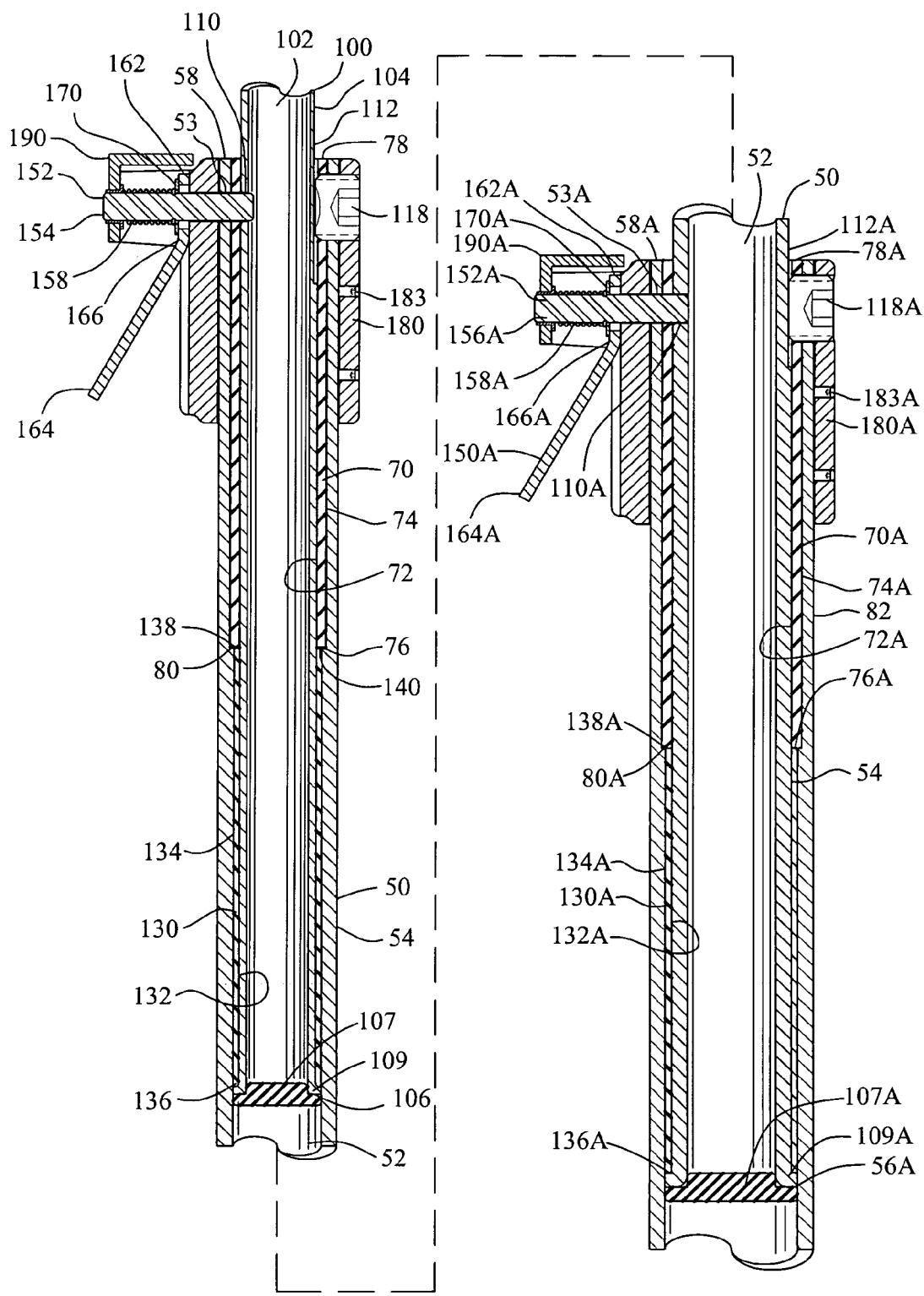

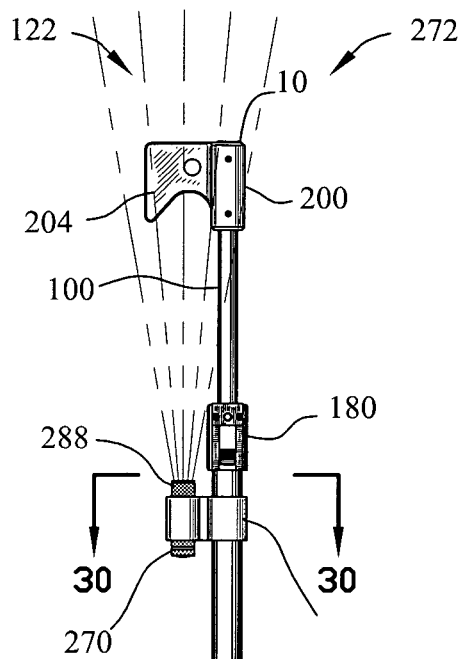
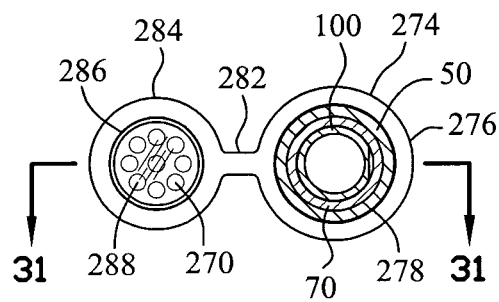
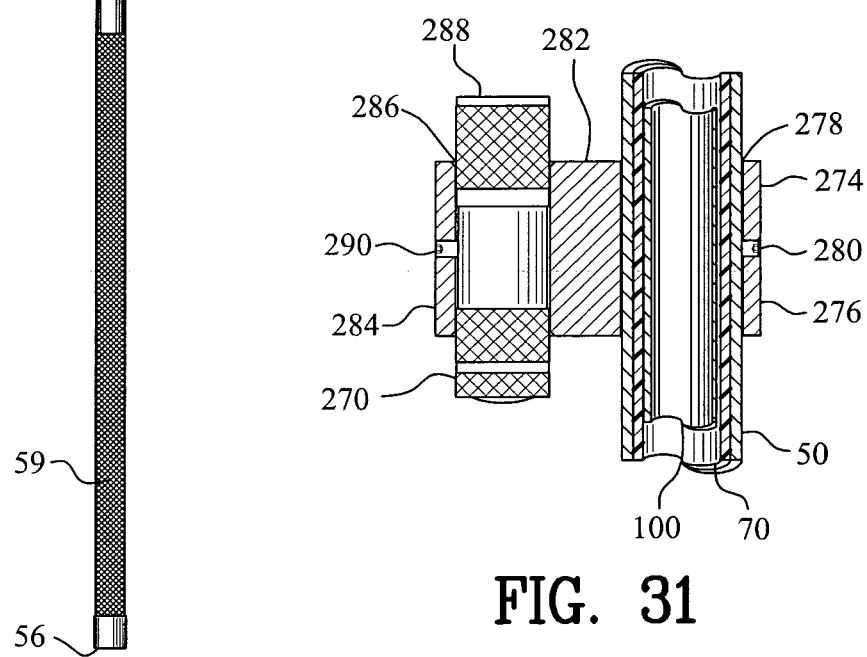
FIG. 29
FIG. 30
FIG. 31

EXTENSION TOOL

CROSS-REFERENCE TO RELATED APPLICATIONS

This application claims benefit of U.S. Patent Provisional application No. 61/197,908 filed Oct. 30, 2008 and U.S. Patent Provisional application No. 61/271,116 filed Jul. 17, 2009. All subject matter set forth in provisional application No. 61/197,908 filed Oct. 30, 2008 and provisional application No. 61/271,116 filed Jul. 17, 2009 is hereby incorporated by reference into the present application as if fully set forth herein.

BACKGROUND OF THE INVENTION

1. Field of the Invention

This invention relates to tools and more particularly to an extension tool.

2. Description of the Related Art

Various types of tools have been devised in the past for moving, rotating, positioning, supporting or contacting an object. One particular application of these tools is a paint stick wherein a paint dispensing device is secured to the end of the tool. The length of the paint stick may be altered by telescoping a first pole relative to a second pole.

Another application of these tools is an outrigger wherein a line may be supported from a first location on a vessel to a second location distant from a vessel. The length of the outrigger may be altered by telescoping a first pole relative to a second pole.

Another application of these tools is a railroad tool wherein a claw is located on an end of the tool for rotating a break actuator on a railroad car. Typically, the railroad car wheel break is actuated by rotating the break actuator. The break actuator may include a wheel having a plurality of spokes extending from a central hub. The rotation of the wheel rotates the hub and a shaft attached thereto for manually engaging a brake shoe to a surface of the railroad car wheel. The engagement of the brake shoe against the railroad car wheel prevents undesired movement of the railroad train car.

In most cases, the break actuator is located on the upper end of the railroad car. This necessitated the railroad employee to climb a ladder between typically two adjacent railroad cars to rotate the wheel on each of the railroad cars. Thereafter, the employee must descend the latter to move to the next railroad car and climb the ladder and rotate the wheel in a similar pattern.

This procedure is very time consuming and possibly dangerous activity since the railroad employee is required to climb the ladders on each of the railroad cars that are in many cases located between two adjacent railroad cars. The following U.S. patents are examples of attempts of the prior art to solve these problems.

U.S. Pat. No. 684,858 to Pearson discloses a wire fence tool comprising a handle, a hatchet-blade thereon having a disk-shaped facial recess in one side. A wire-cutter is seated in the recess and forms a flush portion of the hatchet-blade. An opening lever-handle is connected with the cutter-disk and a retaining loop for the lever-handle. The hatchet-blade and cutter-disk are provided with registering wire-receiving notches.

U.S. Pat. No. 872,271 to Benet discloses a device combining a pair of members connected pivotally together and provided with claws for the purpose of gripping a nail or the like. One of the members is provided with a longitudinal portion for increasing the leverage between the claws. The longitudinal portion terminates at one of its ends in a screw driver blade having a sharp portion and also having shoulders disposed upon opposite sides of the sharp portion. A handle is mounted telescopically upon the longitudinal portion of the blade and is provided with a pair of oppositely disposed impact surfaces for engaging the shoulders and receiving therefrom the force of impact so as to avoid injury to the sharp portion of the screw driver blade.

U.S. Pat. No. 4,646,378 to Borden discloses a combination tool comprising a first and a second tool members with hinge structure pivotally securing the first and the second members together so that they may be selectively pivoted between opened and closed positions of use wherein. The first tool member includes a pair of spaced-apart generally parallel extending side walls forming a sheath portion between which the second tool member may be folded or enclosed in closed position thereof. The first tool member also includes a first tool portion and a first bridge portion at one end thereof and a second bridge portion adjacent the other end thereof but intermediate these ends. The first and second bridge extend between and integrally connecting sidewalls. The second tool member includes a second and third tool portions at opposite ends thereof and an intermediate region adjacent the second tool portion with this intermediate region being disposed between the side walls and hingedly assembled adjacent the other end of the first tool member, wherein in the folded or closed position of the combination tool, the second tool member is disposed between the side walls and resting on the bridge portions and the second and third tool portions extend beyond the opposite ends of the first tool member and the first tool portion is disposed in exposed condition so that all three tool portions are available for use in both the opened and folded or closed conditions of the tool members.

U.S. Pat. No. 4,715,252 to Pella discloses a device for safely rotating the wheel of a large or hard-to-turn valve. The wrench comprises an elongated handle, and a wheel grip. The wheel grip further consists of a rim grip and a spoke grip. The rim grip extends upwardly (when viewed from above) around the bottom of the rim of a valve wheel. The spoke grip extends downwardly, first around the rim of the wheel, then inwardly, so as to grasp the spoke of the valve wheel.

U.S. Pat. No. 4,991,469 to Pella discloses a device for safely rotating the handwheel of hard-to-turn valves has an elongate handle terminating in a fixed wheel-rim-engaging jaw. A movable wheel-engaging jaw is pivotally attached to the handle behind the fixed jaw. When the movable jaw is applied to the inner surface of the handwheel rim and the fixed jaw is applied to the outer surface of the rim, turning force on the handle forces the two jaws together by a leveraged force to enhance gripping of the rim while turning the wheel. Protuberances on the movable jaw enhance gripping the wheel rim and spoke.

U.S. Pat. No. 5,481,950 to Browning discloses a rigid head extending laterally from an adjustable handle has an elongate slot therethrough aligned with the longitudinal axis, of the handle for receiving and operating the handle of a valve. A first concave surface is formed in the upper edge of the head for pushing on the spokes of a brake wheel. The first concave surface has opposite ends of similar slope approaching ninety degrees relative to the upper edge for pushing on the spokes of a brake wheel and preventing kick-out of the tool from the brake wheel. A second concave surface is formed in the lower edge of the head for pulling on the spokes of a brake wheel. A first end of the second concave surface has a slope approaching ninety degrees relative to the lower edge of the head that is significantly less than the slope of the first end to facilitate kick-out of the tool while the brake wheel is in motion. The second concave surface slopes to a point where it joins the outer edge of the head to define a point adapted to fit within a hole in a knuckle of a railroad car.

U.S. Pat. No. 6,182,539 to Webster discloses a telescoping handle assembly including an inner and outer telescoping handle sections. The inner section has an outer surface and a series of grooves at predetermined locations spaced along the length of the inner section. The outer section includes locking teeth that are fixed axially in position along the length of the outer section and that are resiliently movable between a locked condition disposed in one of the grooves on the inner section and an unlocked condition. The handle assembly includes a locking sleeve movable in a first direction to apply radially inwardly directed force to the locking teeth to maintain the locking teeth in the locked condition and thereby to block telescopic movement of the inner section relative to the outer section. The locking sleeve is movable in a second direction opposite the first direction to enable movement of the locking teeth out of the locking condition thereby to enable telescopic movement of the inner section relative to the outer section.

Although the aforementioned prior art have contributed to the development of the art of tools, none of these prior art patents have solved the needs of the art.

Therefore, is an object of this invention to provide an improved tool for moving, rotating or contacting an object.

Another object of this invention is to provide an improved tool for mounting a tool device thereon.

Another object of this invention is to provide an improved tool for mounting a sensor device thereon.

Another object of this invention is to provide an improved tool for mounting a support device thereon.

Another object of this invention is to provide an improved tool for rotating the break actuator of a railroad car for actuating a wheel break.

Another object of this invention is to provide an improved tool for pivoting a knuckle coupler of a railroad car.

Another object of this invention is to provide an improved tool that is light-weight and easy to carry.

Another object of this invention is to provide an improved tool that can be extended and retracted for varying the length of the tool.

Another object of this invention is to provide an improved tool that may be extended and retracted with a minimum resistance force.

Another object of this invention is to provide an improved tool that may be extended and retracted without jamming.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to an improved extension tool. The extension tool comprises a first pole defining an interior bore and a first exterior surface with the first pole extending between a first end and a second end. A second pole defines a second exterior surface with the second pole extending between a first end and a second end. A first bushing defines an internal bore and an exterior surface. A second bushing defines an internal bore and an exterior surface. The second pole is partially disposed in the first pole with the internal bore of the first bushing slidably engaging with the exterior surface of the second pole and with the exterior surface of the second bushing slidably engaging with the internal bore of the first pole for enabling the second pole to be slidably displaced relative to the first pole. A plurality of apertures are defined in the second pole. A pin is mounted to the first pole for movement between a retracted position and a protruded position. A spring biases the pin into the protruded position for extending into a selected one of the plurality of apertures of the second pole for fixing the position of the second pole relative to the first pole. A pin lever moves the pin into the retracted position for permitting displacement of the first pole relative to the second pole. An upper telescoping stop comprises the first bushing cooperating with the second bushing to limit an outward movement of the second pole relative to the first pole upon engagement of the first bushing with the second bushing.

In a more specific embodiment of the invention, a mounting is secured to the second end of the second pole for mounting a device thereon. A collar is secured to the second end of the first pole and has a pin aperture. The pin slidably engages within the collar between a retracted position and a protruded position.

In another embodiment of the invention, the extension tool engages a railroad car. A claw is secured to the second end of the second pole for engaging either a knuckle coupler or a wheel brake of the railroad car.

In another embodiment of the invention, the extension tool comprises a third pole defining an interior bore and a third exterior surface with the third pole extending between a first end and a second end. The first end of the first pole is received within the second end of the third pole for positioning the first pole into the internal bore of the third pole. The first pole has a plurality of apertures defined in the first pole. A second pin lever is pivotably mounted relative to the exterior surface of the third pole. A second pin slidably engages within the second pin lever between a retracted position and a protruded position. The second pin lever is released for positioning the second pin into the protruded position and inserting the second pin into the plurality of apertures of the first pole for terminating displacement of the third pole relative to the first pole. The second pin lever is depressed for positioning the second pin into the retracted position and removing the second pin from the plurality of apertures of the first pole for permitting displacement of the third pole relative to the first pole. In the alternative, either of the first and second pin levers and pins may be replaced by a pin fastener.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which:

FIG. 10 is a sectional view along line 10-10 in FIG. 4;
FIG. 11 is a view similar to FIG. 10 illustrating a pin withdrawn for displacing the second pole relative to the first pole;
FIG. 21 is a side view of a third embodiment of an extension tool wherein a tool, device or support may be utilized on the second pole;
FIG. 21A is an enlarged view of the second end of the second pole illustrating a mounting;
FIG. 22 is a side view of a fourth embodiment of the extension tool wherein the first pole is displaced relative to a third pole;
FIG. 23 is a view similar to FIG. 22 illustrating the extension tool in an expanded position;
FIG. 24 is an alternate embodiment of FIG. 23 illustrating an extension tool having a pin fastener for supporting a first object above a second object;
FIG. 24A is an enlarged view of a pin fastener of FIG. 24;
FIG. 27 is a sectional view along line 27-27 in FIG. 23;
FIG. 28 is a sectional view along line 28-28 in FIG. 23;
FIG. 29 is a side view of a fifth embodiment of an extension tool wherein an illuminator is engaging the first pole for illuminating an area in proximity to the second end of the second pole;
FIG. 30 is a sectional view along line 30-30 in FIG. 29;
FIG. 31 is a sectional view along line 31-31 in FIG. 30.

Similar reference characters refer to similar parts throughout the several Figures of the drawings.

DETAILED DISCUSSION

Figure 1:
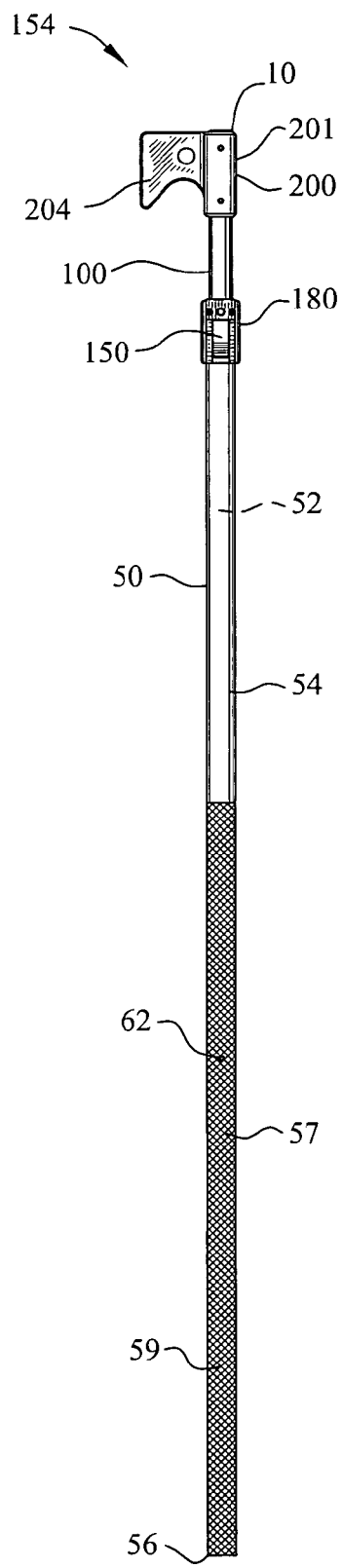
FIG. 1 is a side view of a first embodiment of an extension tool of the present invention.
Figure 2:
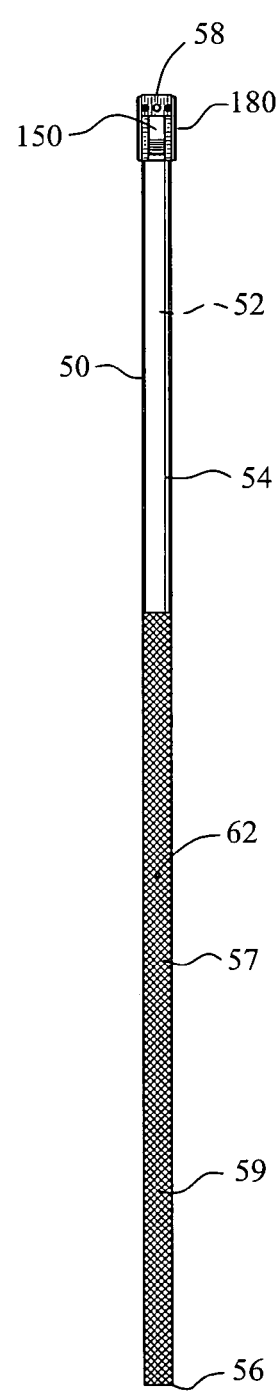
FIG. 2 is a side view of a first pole of FIG. 1.

FIGS. 1-28 are various views of an extension tool 10 for moving, rotating, positioning, supporting or contacting an object. A first embodiment of the extension tool 10 is shown in FIGS. 1-8 and 12-16 wherein the extension tool 10 includes a claw 200 for engaging a railroad car 12. Further embodiments are shown in FIGS. 21-24 wherein the extension tool 10 incorporates either a device 11, tool 15 or support 17.

Figure 12:
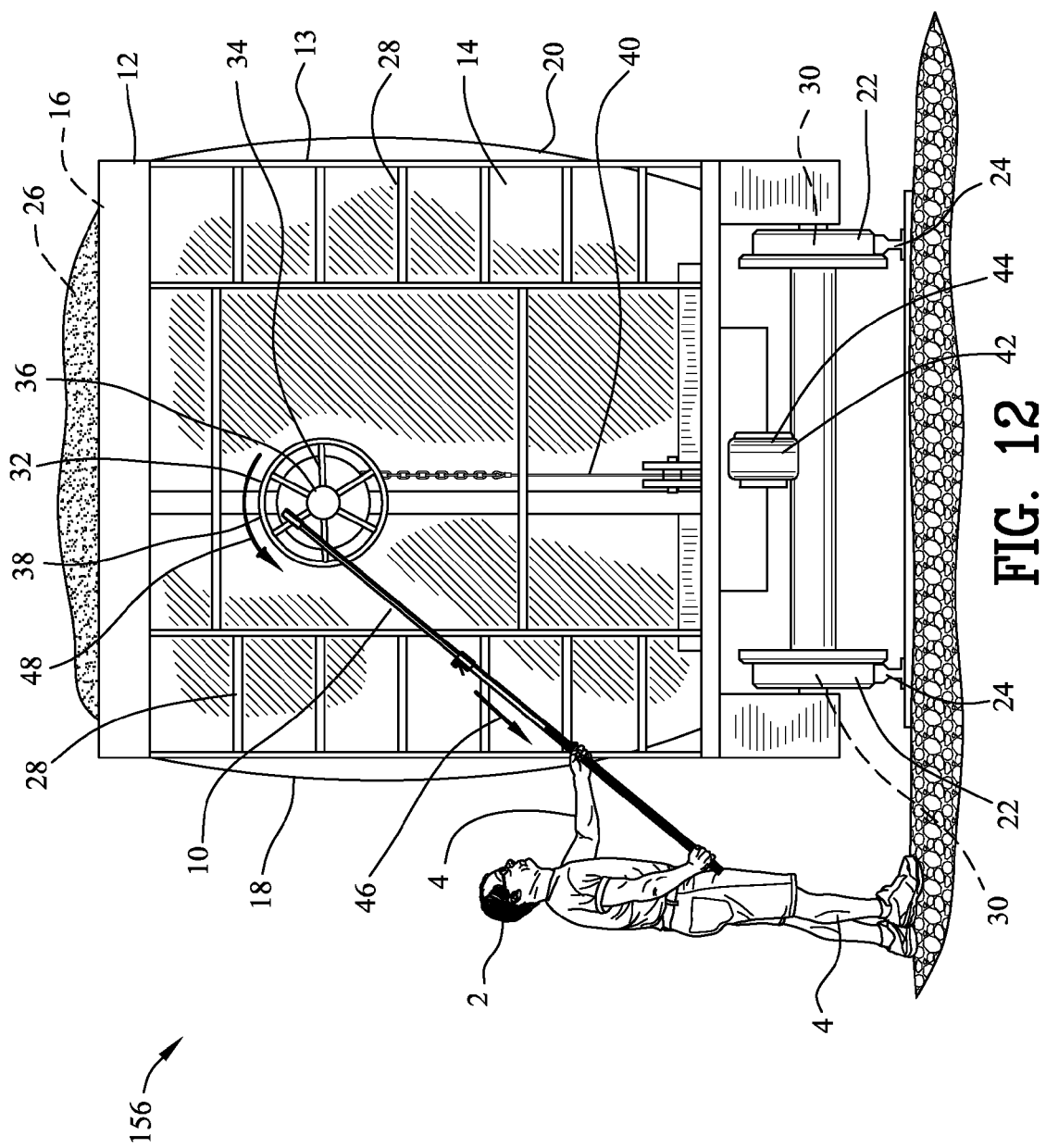
FIG. 12 illustrates the extension tool engaging a brake wheel of a railroad car.
Figure 14:
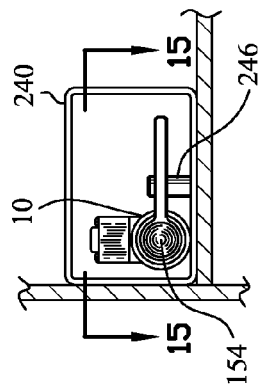
FIG. 14 is a sectional view along line 14-14 in FIG. 13 illustrating the extension tool located in an extension tool container.
Figure 15:
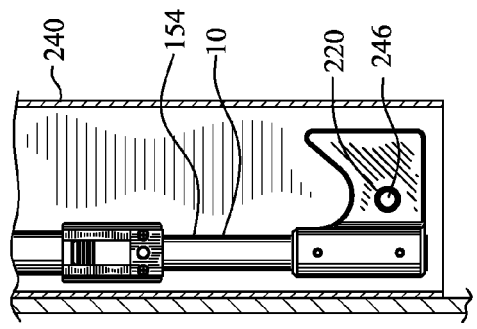
FIG. 15 is a sectional view along line 15-15 in FIG. 14.
Figure 13:
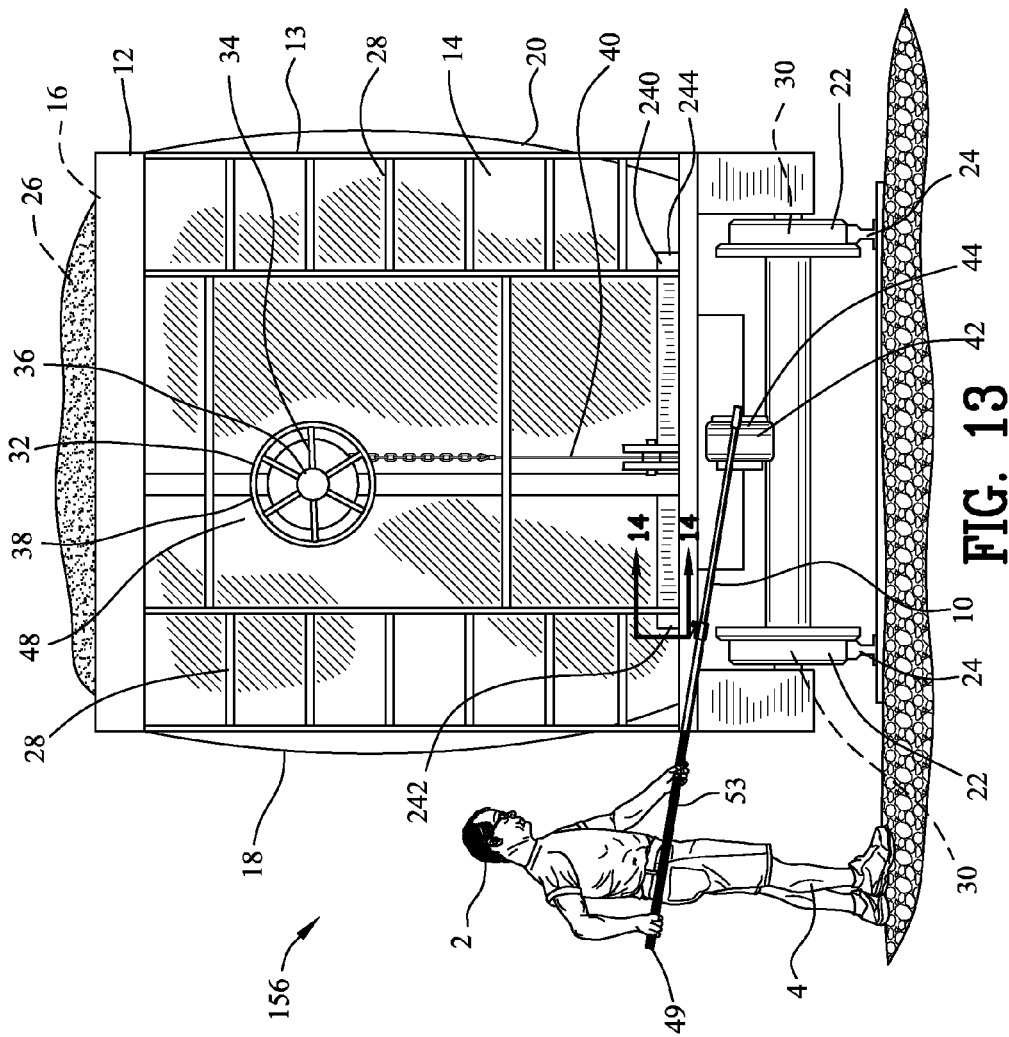
FIG. 13 illustrates the extension tool engaging a knuckle coupler of a railroad car.
Figure 16:
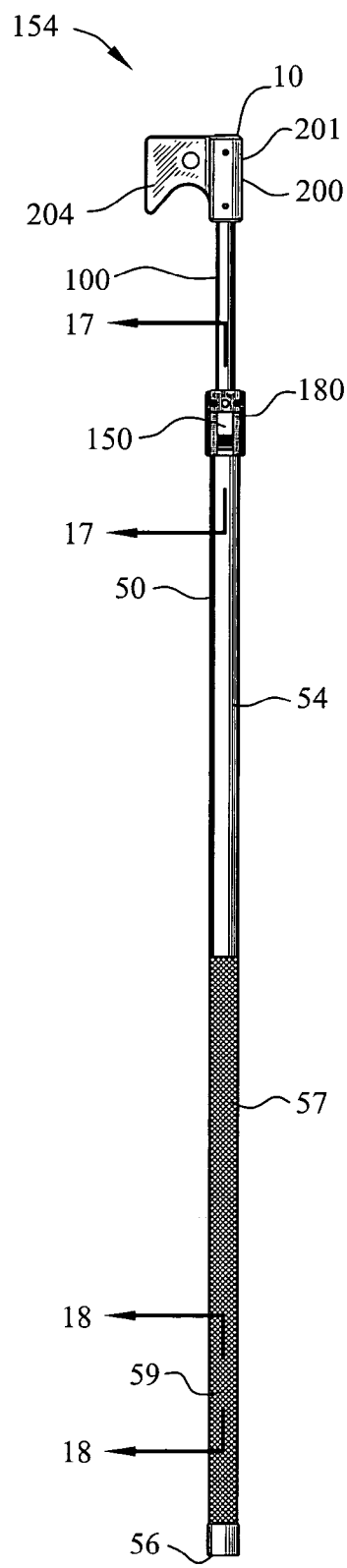
FIG. 16 is a view similar to FIG. 1, illustrating a second embodiment of the extension tool wherein a first bushing and a second bushing are utilized for displacing the second pole relative to the first pole and the second pole having a chord defining a flatten portion engaging with an insert for inhibiting rotation between the second pole relative to the first pole.
Figure 17:
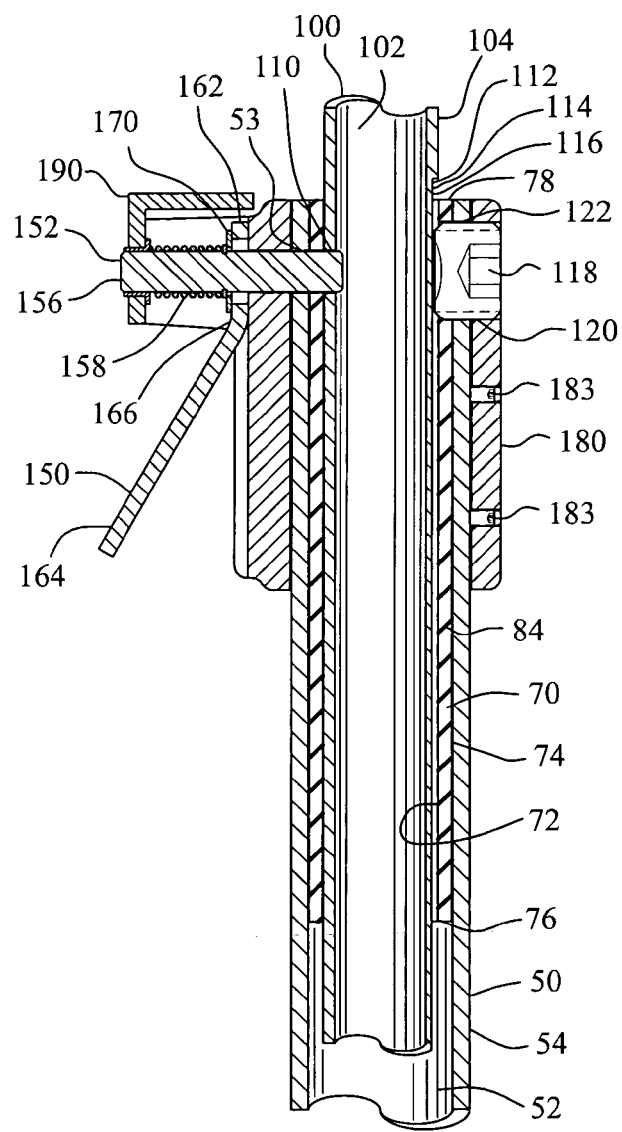
FIG. 17 is a sectional view along line 17-17 in FIG. 16.

As shown in FIGS. 12 and 13, the railroad car 12 includes a container 13 having a front side 14, a rear side 16, a left side 18 and a right side 20. The railroad car 12 further includes a plurality of wheels 22 for rotatably engaging along a rail system 24. The plurality of wheels 22 support the container 13 and permitting the container 13 to be displaced to multiple locations. A brake 30 engages the plurality of wheels 22 for terminating rotation of the plurality of wheels 22. A wheel brake 32 is rotatably coupled to the railroad car 12. The wheel brake 32 has a plurality of spokes 34 extending between a central hub 36 and a circular rail 38. A brake linkage 40 couples the wheel brake 32 with the brake 30 such that upon rotation of the wheel brake 32 the brake either compresses or expands relative to the plurality of wheels 22.

The front side and/or the rear side of the railroad car 12 include a knuckle coupler 42 for linking with a second railroad car 26. The knuckle coupler 42 has a generally J-shape hook 44 for linking with other generally J-shape hooks 44. The knuckle coupler 42 pivotably engage the railroad car 12 for permitting the generally J-shape hook 44 to be displaced during engagement with another generally J-shape hook 44.

In the past an operator 2 was required to ascend a railroad car latter 28 in order to rotate the wheel brake 32. Furthermore, prior to the coupling of the knuckle couplers 42 the operator 2 may be required to apply a horizontal force to the knuckle coupler 42 for pivoting the generally J-shape hooks 44. In the past the operator 2 may have utilized their limbs 4 for pivoting the generally J-shape hooks 44. Having the operator 2 ascending the railroad car latter 28 and positioned in close proximity to the knuckle coupler 42 could prove highly dangerous by causing great bodily harm or death.

Figure 26:
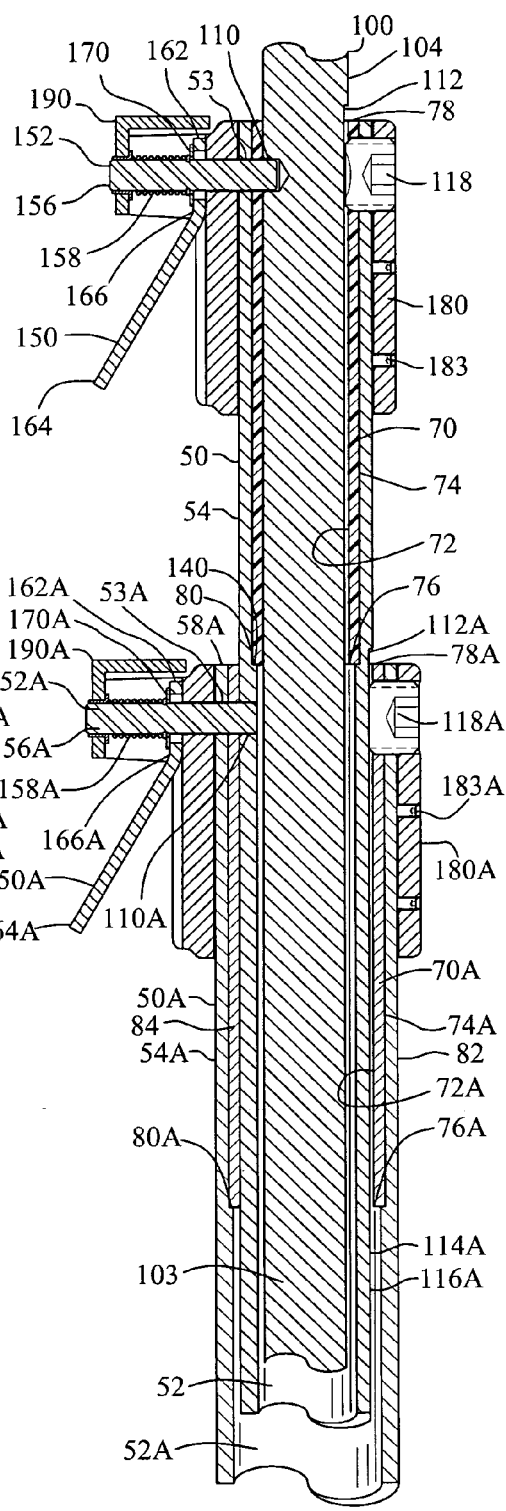
FIG. 26 is a view similar to FIG. 25 illustrating a solid second pole for increasing the strength of the second pole.

FIGS. 1-19 illustrate the tool 10 that may eliminate the need for the operator 2 to ascend the ladder 28 to rotate the wheel brake and to move in between the adjacent railroad cars 12. The tool 10 may be positioned between an extended length 120 and a retracted length 122 for varying the overall length of the tool 10. The tool 10 comprises a first pole 50. The first pole 50 has an internal bore 52, an exterior surface 54 and extends between a first end 56 and a second end 58. A second pole 100 defines a second internal bore 102, a second exterior surface 104 and extends between a first end 106 and a second end 108. As seen in FIGS. 10, 11, 17-20 and 25-28, the second pole 100 has a second internal bore 102 for reducing the weight of the extension tool 10. Alternatively, as seen in FIG. 26 the second pole 100 may have a solid cross-section 103 for increasing the rigidly of the extension tool 10.

Preferably, the first pole 50 has a substantially circular cross-section 51. Similarly, the second pole 100 has a substantially circular cross-section 101.

The first end 106 of the second pole 100 engages the second end 58 of the first pole 50 for positioning the second pole 100 into the internal bore 52 of the first pole 50. A handle 53 is defined in proximity to the first end 56 of the first pole 50 for the operator 2 to engage with the extension tool 10. The exterior surface 54 of the first pole 50 may have a textured surface 59 or a knurled portion 57 for assisting in handling the tool 10.

The second pole 100 has a plurality of apertures 110 extending between the second exterior surface 104 to the second internal bore 102. A pin lever 150 is pivotably mounted relative to the exterior surface 54 of the first pole 50. A pin 152 slidably engages within the pin lever 150 between a retracted position 154 as shown in FIG. 11 and a protruded position 156 as shown in FIG. 10. More specifically, a collar 180 may be utilized for coupling the pin lever 150 to the first pole 50. The collar 180 includes a pole bore 182 for slidably engaging the first pole 50. One or more set screws 183 may be used to secure the collar 180 relative to the first pole 50. A collar bore 188 is aligned with a first pole pin aperture 53 in the first pole 50. The collar 180 further includes a first pin column 184 and a second pin column 186 positioned on opposing sides of the collar bore 188. A bridge member 190 extends and is secured between the first pin column 184 and the second pin column 186. The bridge member 190 has a bridge bore 192 for receiving a bore bushing 194.

The pin lever 150 include a pin plate 162 and a handle plate 164 coupled by an angled portion 166. The pin plate 162 includes a pin bore 163 that is aligned with the collar bore 188. The collar 180 and the bridge member 190 encompass the pin lever 150, pin 152, a pin spring 158, bore bushing 194, a pin key 170 and a pin washer 172. The pin lever 150 slidably engaging through the bridge bore 192, pin bore 163 and the collar bore 188 for contacting the second pole 100. The pin key 170 maintains the pin lever 150 between the collar 180 and the bridge member 190.

The pin lever 150 is released for positioning the pin 152 into the protruded position 156. The pin spring 158 biases the pin lever 150 to the protruded position 156 in the absent a force 160 applied to the pin lever 150. The protruded position 156 permits the insertion of the pin 152 into one of the plurality of apertures 110 of the second pole 100. Upon insertion of the pin 152 into one of the plurality of apertures 110, the first pole 50 terminates displacement relative to the second pole 100. Since the handle plate 164 is substantially longer than the pin plate 162 and the angled portion 166 couples the pin plate 162 and a handle plate 164, the pin lever 150 applies a mechanical advantage force 168 against the pin spring 158 upon the force 160 being applied to the handle plate 164. A pin key 170 encircles the pin 152 and engages the pin lever 150 for retracting the pin 152 relative to the pin lever 150.

To vary the overall length of the tool 10, the force 160 is applied to the handle plate 164. The force 160 causes the pin plate 162 to impress against the pin key 170 and to compress the spring 158. The pin key 170 displaces the pin 152 into the retracted position 154 and removes the pin 152 from one of the plurality of apertures 110 of the second pole 100. Upon the pin 152 removed from one of the plurality of apertures 110, the second pole 100 is permitted to displace relative to the first pole 50.

Figure 7:
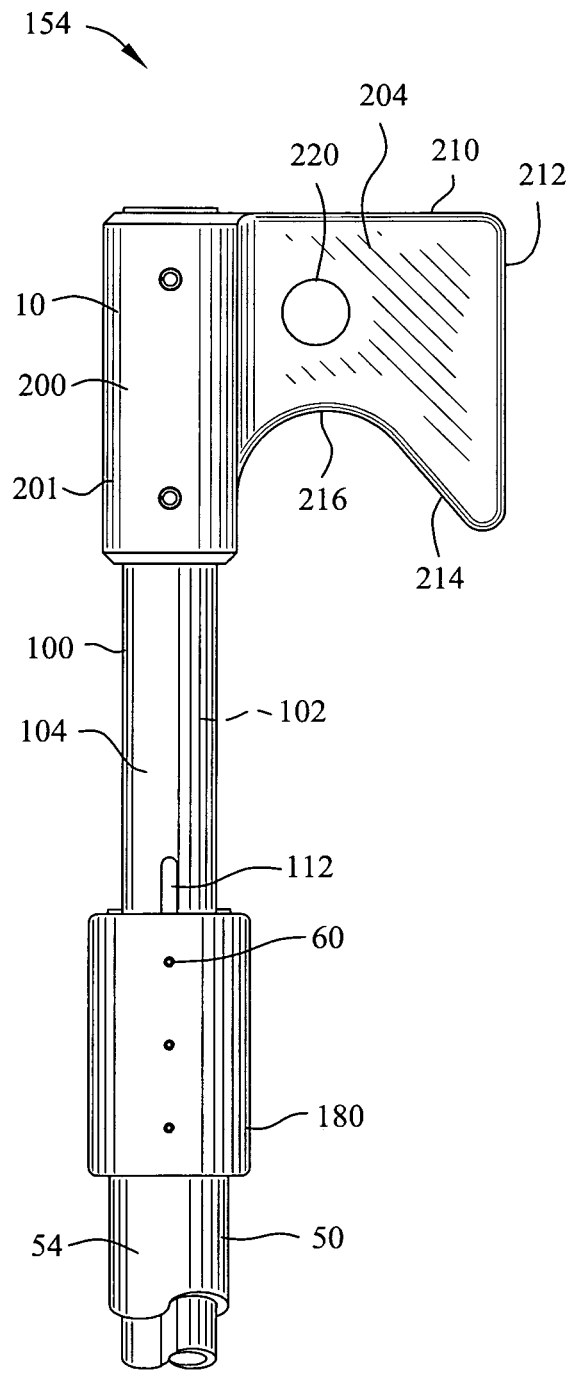
FIG. 7 is a rear view of FIG. 4.
Figure 8:
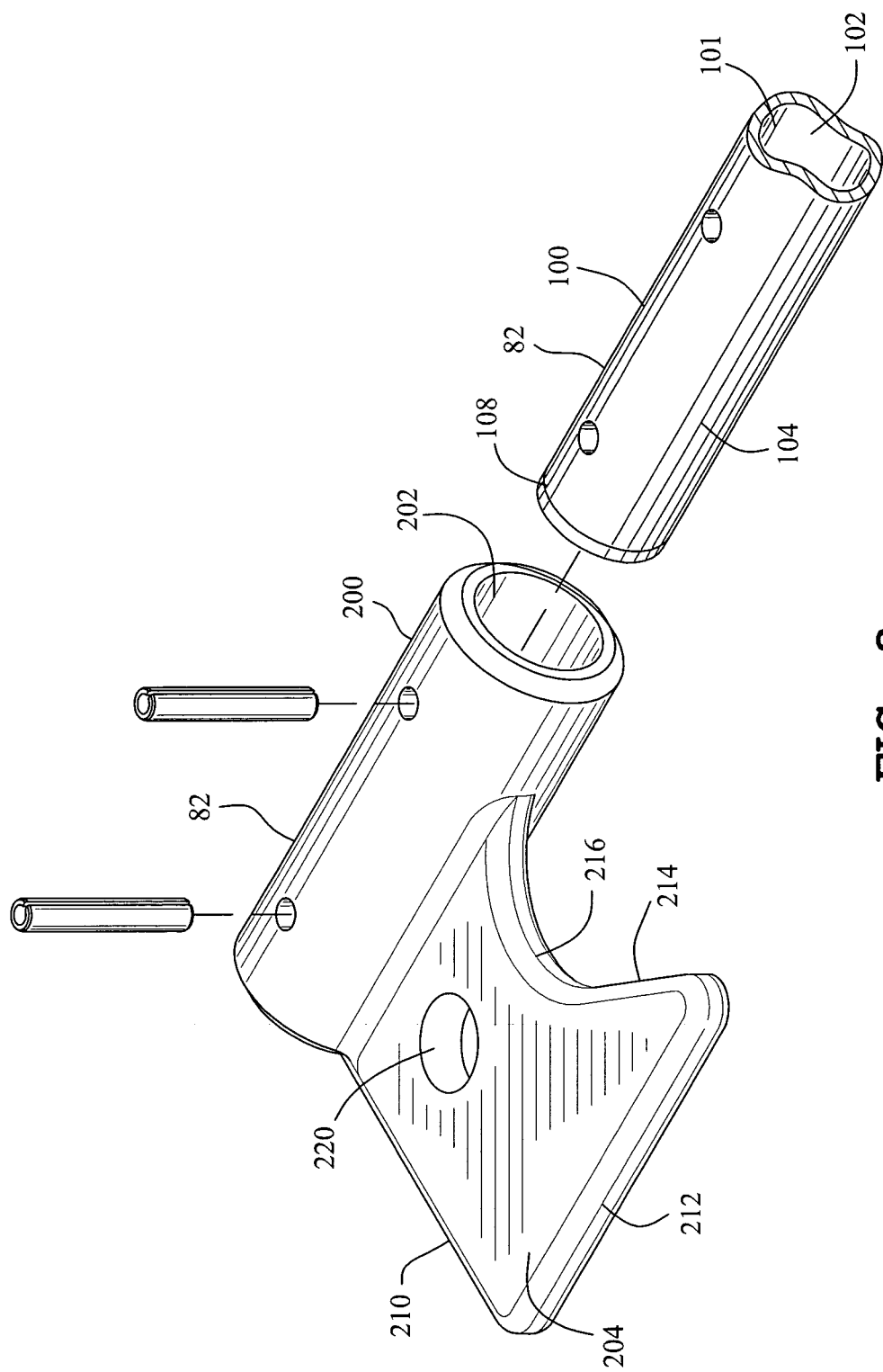
FIG. 8 is an isometric exploded view of a portion of FIG. 4.
Figure 9:
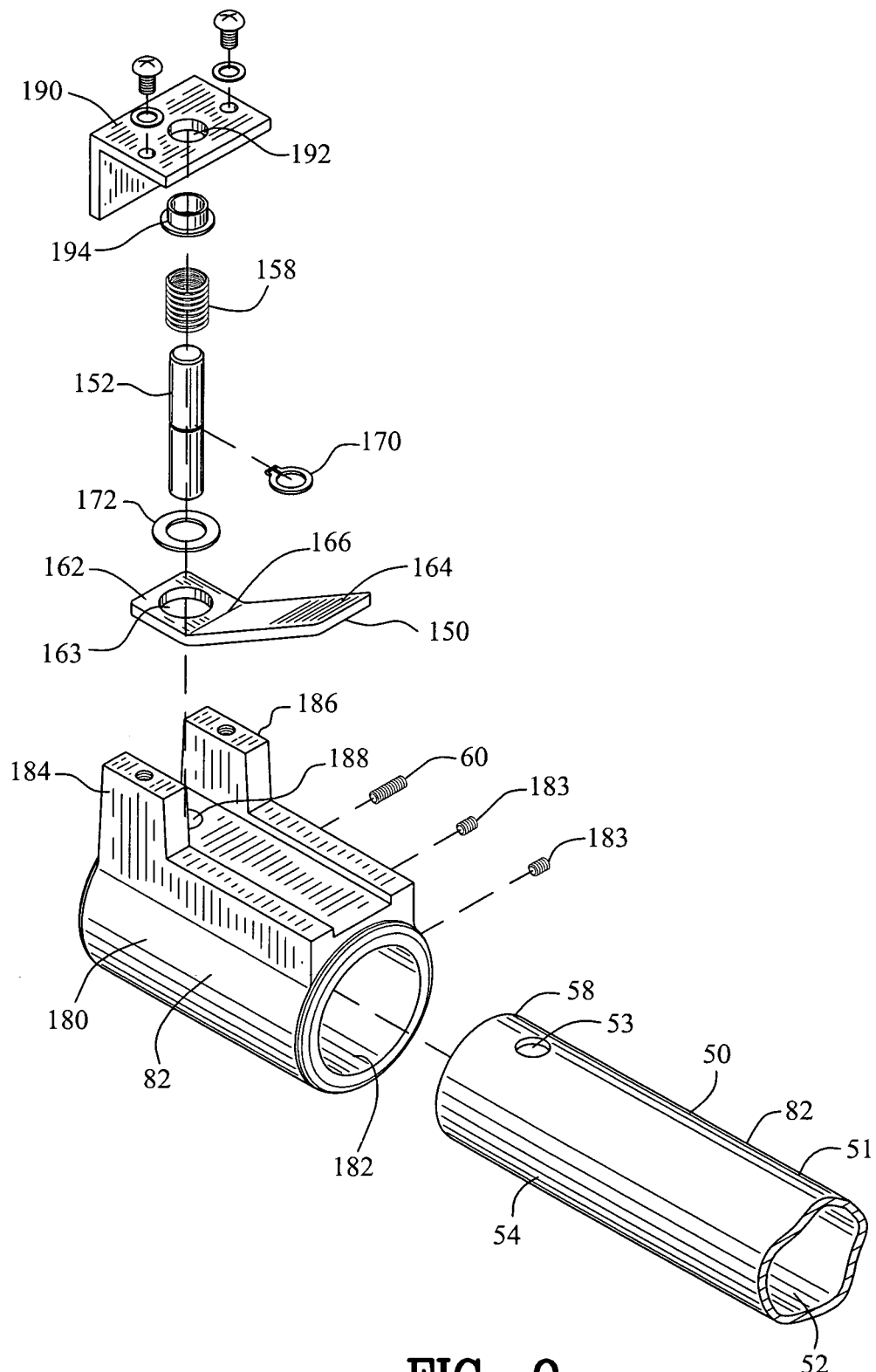
FIG. 9 is an isometric exploded view of a portion of FIG. 4.

As best seen in FIGS. 7, 10 and 11, the first pole 50 includes a guide pin 60 extending within the internal bore 52 of the first pole 50. The second exterior surface 104 of the second pole 100 includes a guide groove 112. The guide pin 60 slidably engages within the guide groove 112 for preventing rotation of the second pole 100 relative to the first pole 50 during the pin 152 located in the retracted position 154.

As best seen in FIGS. 17, 19, 20 and 25-28 alternatively, the second exterior surface 104 of the second pole 100 may include a chord 114 defining a flatten portion 116 of the substantially circular cross-section 101. An anti-rotation insert 118 extends form the collar 180 into the interior bore 52 of the first pole 50 and is positioned adjacent to the chord 114 for inhibiting rotation between the second pole 100 relative to the first pole 50. Furthermore, the anti-rotation insert 118 extending from the collar 180 into the interior bore 52 defines a collar lock 120 for securing the collar 180 to the first pole 50. In addition, the anti-rotation insert 118 extending from the collar 180 into the interior bore 52 defines a bushing lock 122 for securing a first bushing 70 to the first pole 50.

Figure 3:
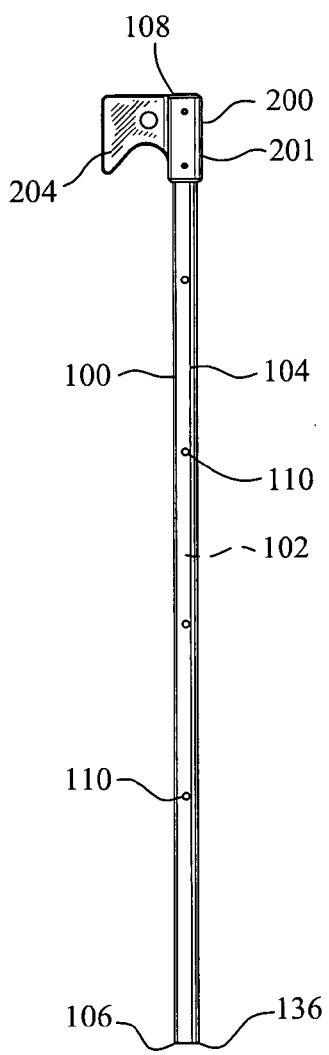
FIG. 3 is a side view of a second pole of FIG. 2.
Figure 5:
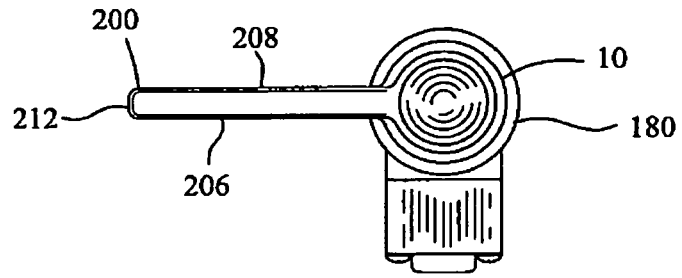
FIG. 5 is a top view of FIG. 4.
Figure 4:
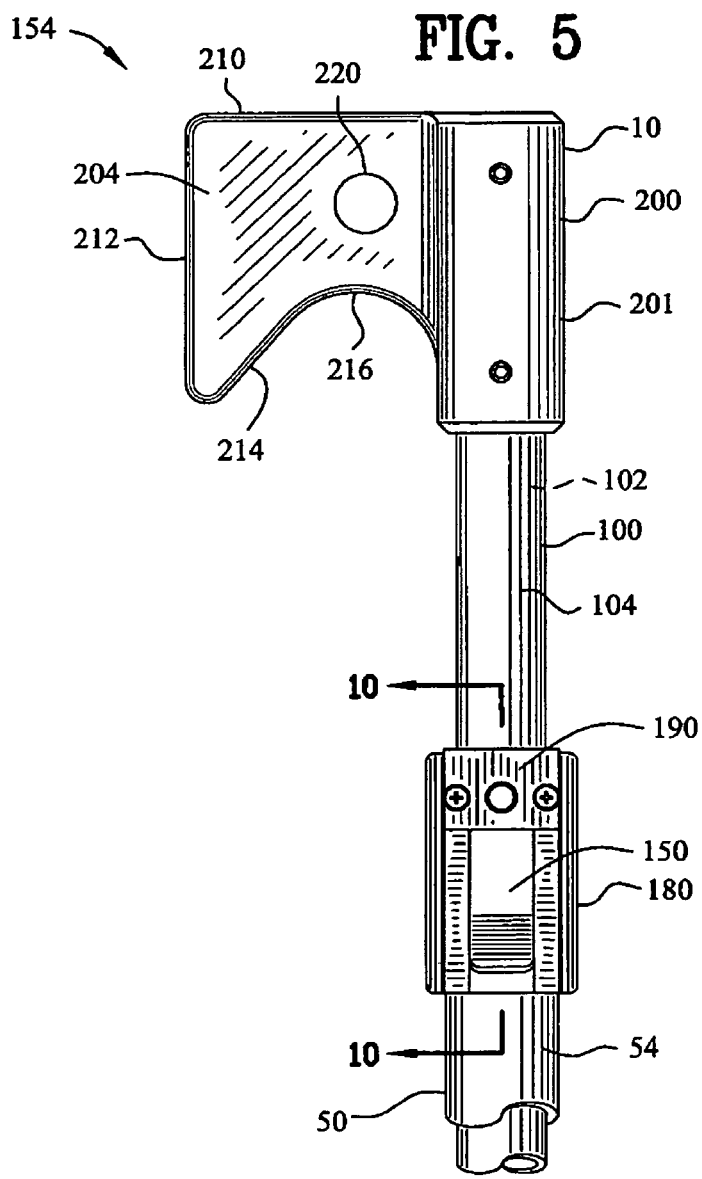
FIG. 4 is an enlarged portion of FIG. 1.
Figure 6:
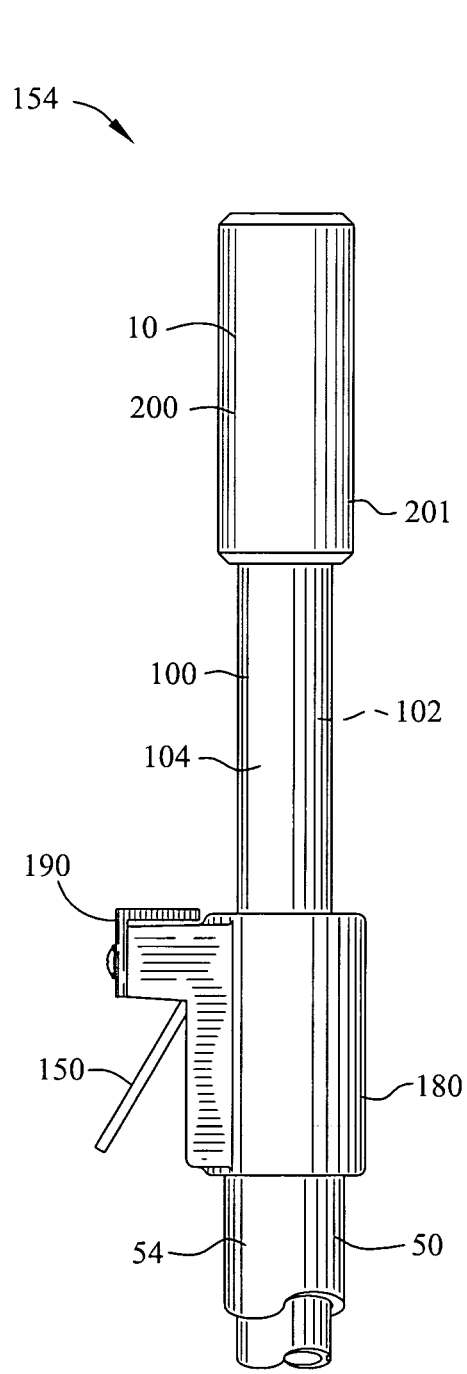
FIG. 6 is a right side view of FIG. 4.
Figures 18, 19:
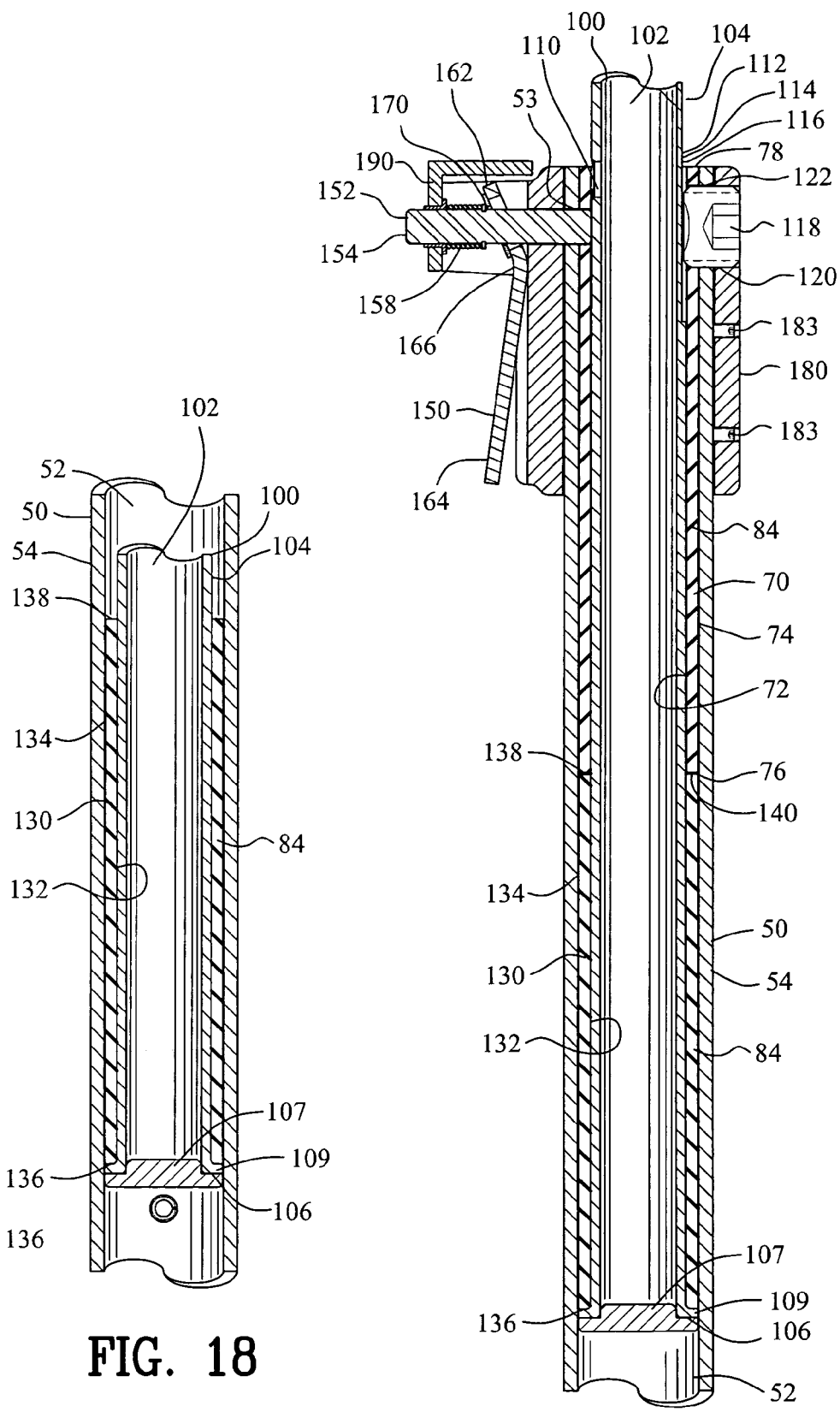
FIG. 18 is a sectional view along line 18-18 in FIG. 16.
FIG. 19 is a view similar to FIG. 17 illustrating the first bushing contacting the second bushing for defining an upper telescoping stop and terminating further extension of the second pole relative to the first pole.
Figure 20:
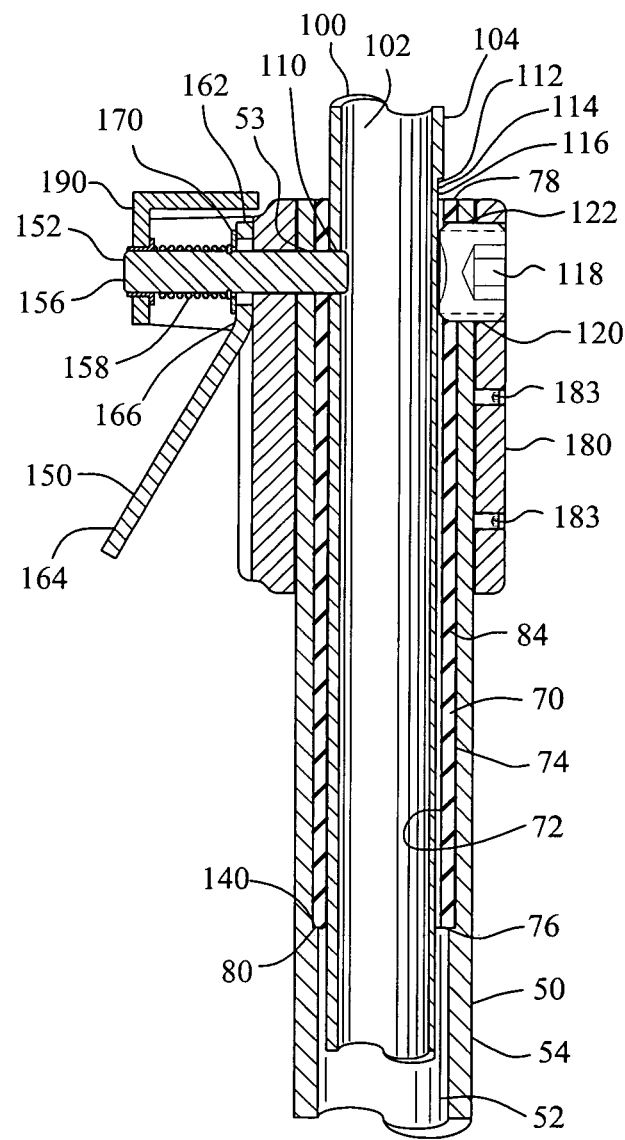
FIG. 20 is a view similar to FIG. 17 illustrating the first pole including a counterbore for receiving the first bushing.
Figure 25:
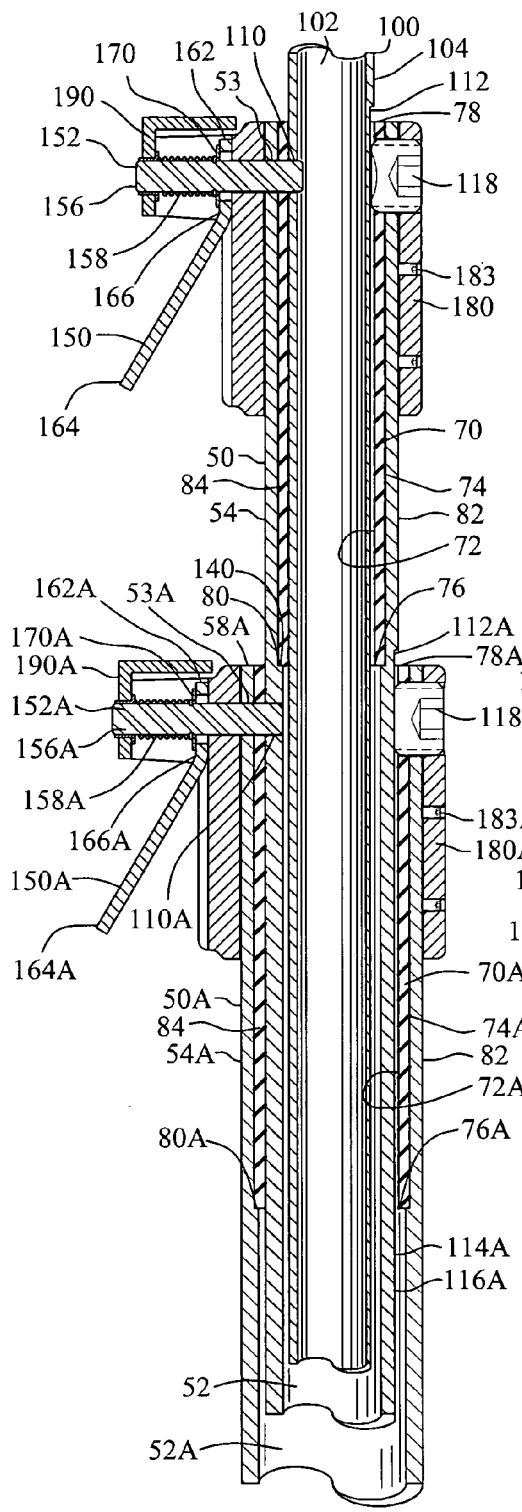
FIG. 25 is a sectional view along line 25-25 in FIG. 22.

As seen in FIGS. 1, 3 and 18, the first pole 50 includes a stop pin 62 traversing the internal bore 52 of the first pole 50 for engaging the first end 106 of the second pole 100. Upon engagement between the stop pin 62 and the first end 106 of the second pole 100 the second pole 100 is terminated from further retraction of the second pole 100 into the first pole 50.

The tool 10 includes a claw 200 for directly engaging the wheel brake 32 and the knuckle coupler 42. The claw 200 is secured to the second end 108 of the second pole 100 by a mounting 201. The claw 200 includes a pole receiver 202 for engaging over the second end 108 of the second pole 100. A plate 204 extends from the pole receiver 202. The plate 204 defines a first side 206, a second side 208, a top edge 210, a side edge 212 and a bottom edge 214. The bottom edge 214 includes an arcuate recess 216 for preventing disengaging between either the knuckle coupler 42 or the wheel brake 32 of the railroad car 12 with the extension tool 10. More specifically, the arcuate recess 216 encircles one of the plurality of spokes 34. As shown in FIGS. 12 and 13 a tool force 46 is applied to the tool 10 which in turn applied either a rotational force 48 to the wheel brake 32 as shown in FIG. 12 or a pivoting force 49 to the knuckle coupler 42 as shown in FIG. 13.

As seen in FIGS. 4, 7, 8 and 13-15, the claw 200 may further include a locking bore 220. The locking bore 220 traverses the plate 204 for securing the extension tool 10 to the railroad car 12. The extension tool 10 may be positioned within an elongated channel 240. The elongated channel 240 includes a first channel aperture 242 and a second channel aperture 244 for positioning the extension tool 10 within the elongated channel 240. A post 246 is positioned within the elongated channel 244 for engaging with the locking bore 220 of the extension tool 10. The engagement between the extension tool 10 and the post 246 prevents the extension tool 10 from being accidentally engaged from the railroad car 12.

FIGS. 16-19 illustrate a second embodiment of the invention wherein the extension tool 10 includes a first bushing 70 and a second bushing 130. The first bushing 70 defines an internal bore 72, an exterior surface 74 and extending between a first end 76 and a second end 78. A second bushing 130 defines an internal bore 132, an exterior surface 134 and extending between a first end 136 and a second end 138. The first bushing 70 is secured within the internal bore 52 of the first pole 50. As seen in FIGS. 20 and 25-28, the internal bore 52 of the first pole 50 may include a counterbore 80 for receiving the first bushing 70. The first bushing 70 is retained within the counterbore 80 by the anti-rotation insert 118.

The second bushing 130 is secured over the exterior surface 104 of the second pole 100. Preferably, the second bushing 130 is affixed to the exterior surface 104 of the second pole 100 by a suitable adhesive or a mechanical fastener or the like. Furthermore, the first end 106 of the second pole 100 may included an outwardly flared edge 109 and a resilient bumper 107. The second pole 100 slidably engages within the internal bore 72 of the first bushing 70 for telescoping the second pole 100 relative to the first pole 50. Furthermore, the second bushing 130 slidably engages within the internal bore 52 of the first pole 50 for telescoping the second pole 100 relative to the first pole 50. The first bushing 70 and the second bushing 130 reduce the friction between the first pole 50 and the second pole 100 during extension and retraction between the first pole 50 and the second pole 100. The first bushing 70 and the second bushing 130 also prevent jamming between the first pole 50 and the second pole 100 during extension and retraction between the first pole 50 and the second pole 100. Preferably, the first pole 50, the second pole 100 and the collar 180 are formed of a metallic material 82 such as aluminum, steel or other metallic materials. Furthermore, the first bushing 70 and the second bushing 130 may be formed of a polymeric material for creating a metallic 82 to polymeric 84 sliding engagement between the first pole 50 and the second pole 100.

As seen in FIG. 19 the first end 76 of the first bushing 70 and the second end 138 of the second bushing 130 contact for defining an upper telescoping stop 140. The upper telescoping stop 140 terminates further extension of the second pole 100 from within the first pole 50.

As seen in FIGS. 21-24, the mounting 201 may couple the second end 108 of the second pole 100 with a device 11 such as a gas meter sensor 90 or other devices, a tool 15 such as a hook 92 or other tools, or a support 17 such as a tent pole support 94, a temporary brace 96, a drywall brace 98 or other supports.

FIG. 21A is an enlarged view of the second end 108 of the second pole 100 illustrating a mounting 201. In this example, the mounting 201 includes a threaded bore 209 for receiving a threaded stud (not shown) for mounting a tool device support or the like.

FIGS. 22-28 illustrate a fourth embodiment of an extension tool 10 wherein the first pole 50 is displaced relative to a third pole 50A. The third pole 50A defines an interior bore 52A and a third exterior surface 54A with said third pole 50A extending between a first end 56A and a second end 58A. The first end 56 of the first pole 50 is positioned within the second end 58A of the third pole 50A for positioning the first pole 50 into the internal bore 52A of the third pole 50A. The first pole 50 includes a plurality of apertures 110A defined in the first pole 50. A second pin lever 150A is pivotably mounted relative to the exterior surface 54A of the third pole 50A. A second pin 152A slidably engaging within the second pin lever 150A between a retracted position 154A and a protruded position 156A.

FIG. 24A is an enlarged view of a pin fastener 260 of FIG. 24 for terminating displacement of the second pole 100 relative to the first pole 50. The pin fastener comprising a knob 262 having a threaded pin 264. The threaded pin 264 threatably engages a threaded aperture 266 defined in the collar 180A. The threaded pin 264 extends through the threaded aperture 266 to be received into one of the plurality of apertures 110 of the second pole 100.

The second pin lever 150A is released for positioning the second pin 152A into the protruded position 156A and inserting the second pin 152A into the plurality of apertures 110A of the first pole 50 for terminating displacement of the third pole 50A relative to the first pole 50. The second pin lever 150A is depressed for positioning the second pin 152A into the retracted position 154A and removing the second pin 152A from the plurality of apertures 110A of the first pole 50 for permitting displacement of the third pole 50A relative to the first pole 50.

A third bushing 70A defining an internal bore 72A, an exterior surface 74A and extending between a first end 76A and a second end 78A. A fourth bushing 130A defining an internal bore 132A, an exterior surface 134A and extending between a first end 136A and a second end 138A. The third bushing 70A is secured within the internal bore 52A of the third pole 50A. The fourth bushing 130A is secured over the exterior surface 54 of the first pole 50. The first pole 50 slidably engaging within the internal bore 72A of the third bushing 70A for telescoping the third pole 50A relative to the first pole 50. The fourth bushing 130A slidably engaging within the internal bore 132A of the third pole 50A for telescoping the third pole 50A relative to the first pole 50.

A second upper telescoping stop 140A comprises the third bushing 70A cooperating with the fourth bushing 130A to limit an outward movement of the first pole 50 relative to the third pole 50A upon engagement of the third bushing 70A with the fourth bushing 130A. All further structure and function of the third pole 50A is equivalent to that of the first pole 50.

FIGS. 29-31 are various views a fifth embodiment of the extension tool 10 wherein an illuminator 270 is engaging the first pole 50 for illuminating an area 272 in proximity to the second end 108 of the second pole 100. The illuminator 270 may include a holder 274. The holder 274 has a first cylindrical body 276 for defining a first illuminator bore 278. The first illuminator bore 278 slidably engages the first pole 50. A first body set screw 280 traversing the first cylindrical body 278 and compressing into the first pole 50 to terminate displacement of the illuminator 270 relative to the extension tool 10. The illuminator 270 further includes a spacer plate 282 for distancing a second cylindrical body 284 from the first pole 50. The second cylindrical body 284 defines a second illuminator bore 286 for receiving a cylindrical illuminating device 288. A second body set screw 290 traversing the second cylindrical body 284 and compressing into the cylindrical illuminating device 288 to terminate displacement of the cylindrical illuminating device 288 relative to the holder 274.

Figure 33:
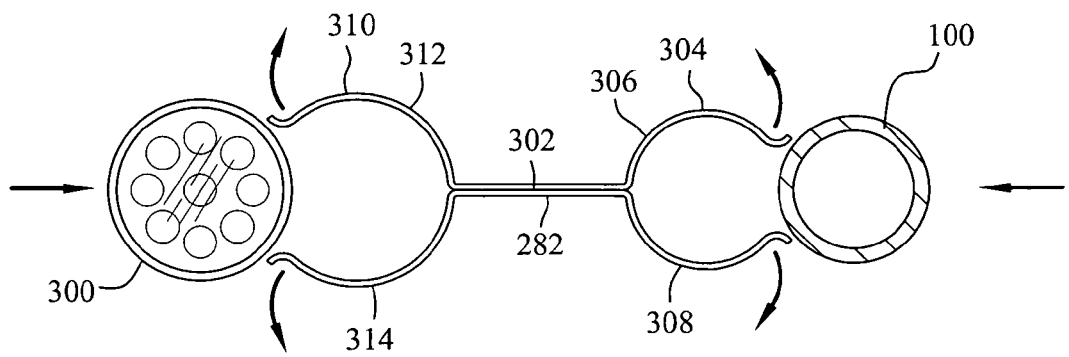
FIG. 33 is a top view of FIG. 32 illustrating the second illuminator in the process of engaging the second pole and a cylindrical illuminating device.
Figure 34:
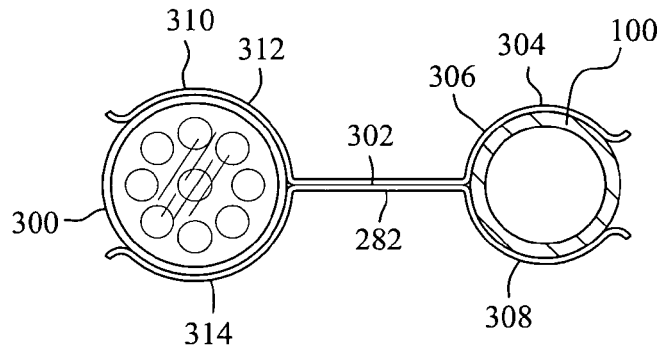
FIG. 34 is a view similar to FIG. 33 illustrating the second illuminator fully engaged with the second pole and the cylindrical illuminating device.
Figure 32:
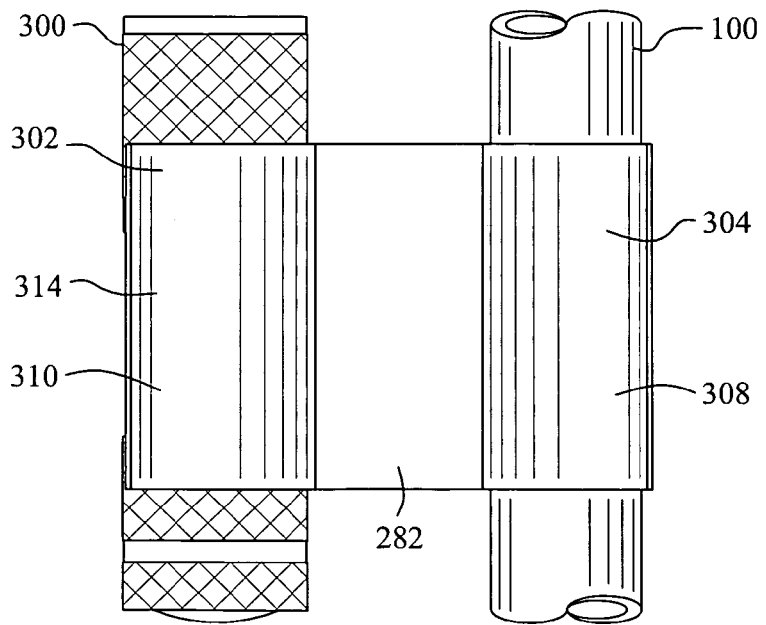
FIG. 32 is a side view of a second illuminator engaging the second pole for illuminating an area in proximity to the second end of the second pole.

FIGS. 32-34 illustrate a second illuminator 300 engaging the second pole 100 for illuminating an area 272 in proximity to the second end 108 of the second pole 100. The second illuminator 300 may include a second holder 302. The second holder 302 has a first clamp 304 defining a first clamp arm 306 and a second clamp arm 308. The first clamp arm 306 and the second clamp arm 308 of the first clamp 304 yield upon engaging with the second pole 100 and apply a compressive force upon the second pole 100 when fully engaged. The compressive force terminates displacement of the second illuminator 300 relative to the extension tool 10. The second illuminator 300 further includes a spacer plate 282 for distancing a second clamp 310 from the second pole 100. The second clamp 310 defines a third clamp arm 312 and a fourth clamp arm 314. The third clamp arm 312 and the fourth clamp arm 314 of the second clamp 310 yield upon engaging with the cylindrical illuminating device 288 and apply a compressive force upon the cylindrical illuminating device 288 when fully engaged. The compressive force terminates displacement of the cylindrical illuminating device 288 relative to the second illuminator 300.

Although the extension tool 10 has been shown with the specific applications or uses, it should be appreciated to those skilled in the art that the extension tool 10 may be used for countless other applications and uses. A small but not inclusive list of readily apparent applications and uses include window cleaning, tent poles, gaff hooks, mooring poles, drywall supports, outboard motor, trailer supports, remote positioning of objects, gas sensors, load lock for trucks, garden tools, towers for vessels and illumination stands.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. An extension tool for engaging a railroad car, the railroad car including a front side, a rear side, a left side and a right side, the front side and the rear side including a knuckle coupler for linking with a second railroad car, the front side and the rear side also including, a wheel brake for engaging a railroad brake, the extension tool, comprising:
    a first pole defining an interior bore, a first exterior surface and extending between a first end and a second end;
    a second pole defining a second exterior surface and extending between a first end and a second end;
    said first end of said second pole positioned within said second end of said first pole for positioning said second pole into said internal bore of said first pole;
    said second pole having a plurality of apertures defined in said second pole;
    a pin lever pivotal mounted relative to said exterior surface of said first pole;
    a pin slidably engaging within said pin lever between a retracted position and a protruded position;
    said pin lever released for positioning said pin into said protruded position and inserting said pin into said plurality of apertures of said second pole for terminating displacement of said first pole relative to said second pole;
    said pin lever depressed for positioning said pin into said retracted position and removing said pin from said plurality of apertures of said second pole for permitting displacement of said first pole relative to said second pole;
    said pin lever includes a spring for biasing said pin into said protruded position;
    a claw securing to said second end of said second pole for engaging either the knuckle coupler or the wheel brake of the railroad car;
    a first pin column and a second pin column positioned on opposing sides of the pin lever;
    a bridge member extending and coupled to said first pin column and said second pin column; and
    said bridge member having a bridge bore for receiving said pin.

2. An extension tool for engaging a railroad car as set forth in claim 1,
    wherein said first pole includes a guide pin extending within said internal bore of said first pole,
    said second exterior surface of said second pole having a guide groove; and
    said guide pin engaging said guide groove for preventing rotation of said second pole relative to said first pole during said pin in said retracted position.

3. An extension tool for engaging a railroad car as set forth in claim 1, wherein said first pole include a stop pin traversing said internal bore of said first pole for engaging said first end of said second pole.

4. An extension tool for engaging a railroad car as set forth in claim 1, wherein said pin lever includes a pin plate and a handle plate coupled by an angled portion;
    said pin plating includes a pin bore for receiving said pin;
    said handle plate is substantially longer than said pin plate;
    said angled portion and said substantially longer handle plate relative to said pin plate defining a mechanical advantage tool; and
    said mechanical advantage tool applying a mechanical advantage force against said pin spring upon a force being applied to said handle plate.

5. An extension tool, comprising:
    a first pole defining an interior bore and a first exterior surface with said first pole extending between a first end and a second end;
    a second pole defining a second exterior surface with said second pole extending between a first end and a second end;
    a third pole defining an interior bore and a third exterior surface with said third pole extending between a first end and a second end;
    said first end of said second pole positioned within said second end of said first pole for positioning said second pole into said internal bore of said first pole;
    said first end of said first pole positioned within said second end of said third pole for positioning said first pole into said internal bore of said third pole;
    said second pole having a plurality of apertures defined in said second pole;
    a first pin fastener removably mounted relative to the said first pole for inserting into said plurality of apertures of said second pole for terminating displacement of said first pole relative to said second pole;
    said first pole having a plurality of apertures defined in said first pole;
    a second pin lever pivotably mounted relative to said exterior surface of said third pole;
    a second pin slidably engaging within said second pin lever between a retracted position and a protruded position;
    said second pin lever released for positioning said second pin into said protruded position and inserting said second pin into said plurality of apertures of said first pole for terminating displacement of said third pole relative to said first pole;
    said second pin lever depressed for positioning said second pin into said retracted position and removing said second pin from said plurality of apertures of said first pole for permitting displacement of said third pole relative to said first pole;
    a first pin column and a second pin column positioned on opposing sides of the second pin lever;
    a bridge member extending and coupled to said first pin column and said second pin column; and
    said bridoe member having a bridge bore for receivino said second pin.

6. An extension tool as set forth in claim 5, further including a first bushing defining an internal bore, an exterior surface and extending between a first end and a second end;
    a second bushing defining an internal bore, an exterior surface and extending between a first end and a second end;
    a third bushing defining an internal bore, an exterior surface and extending between a first end and a second end,
    a fourth bushing defining an internal bore, an exterior surface and extending between a first end and a second end;
    said first bushing securing within said internal bore said first pole;

said second bushing securing over said exterior surface of said second pole;

said third bushing securing within said internal bore of said third pole;

said fourth bushing securing over said exterior surface of said first pole;

said second pole slidably engaging within said internal bore of said first bushing for telescoping said second pole relative to said first pole;

said second bushing slidably engaging within said internal bore of said first pole for telescoping said second pole relative to said first pole;

said first pole slidably engaging within said internal bore of said third bushing for telescoping said third pole relative to said first pole; and said fourth bushing slidably engaging within said internal bore of said third pole for telescoping said third pole relative to said first pole.

7. An extension tool as set forth in claim 5, further including a first bushing defining an internal bore, an exterior surface and extending between a first end and a second end;

a second bushing defining an internal bore, an exterior surface and extending between a first end and a second end;

a third bushing defining an internal bore, an exterior surface and extending between a first end and a second end;

a fourth bushing defining an internal bore, an exterior surface and extending between a first end and a second end;

said first bushing securing within said internal bore of said first pole;

said second bushing securing over said exterior surface of said second pole;

said third bushing securing within said internal bore of said third pole;

said fourth bushing securing over said exterior surface of said first pole;

said second pole slidably engaging within said internal bore of said first bushing for telescoping said second pole relative to said first pole;

said second bushing slidably engaging within said internal bore of said first pole for telescoping said second pole relative to said first pole;

said first pole slidably engaging within said internal bore of said third bushing for telescoping said third pole relative to said first pole;

said fourth bushing slidably engaging within said internal bore of said third pole for telescoping said third pole relative to said first pole;

an first upper telescoping stop comprising said first bushing cooperating with said second bushing to limit an outward movement of said second pole relative to said first pole upon engagement of said first bushing with said second bushing;

a second upper telescoping stop comprising said third bushing cooperating with said fourth bushing to limit an outward movement of said first pole relative to said third pole upon engagement of said third bushing with said fourth bushing.

8. An extension tool as set forth in claim 5, further including a first bushing defining an internal bore, an exterior surface and extending between a first end and a second end;

a second bushing defining an internal bore, an exterior surface and extending between a first end and a second end;

a third bushing defining an internal bore, an exterior surface and extending between a first end and a second end;

a fourth bushing defining an internal bore, an exterior surface and extending between a first end and a second end;

said first bushing securing within said internal bore of said first pole;

said second bushing seeming over said exterior surface of said second pole;

said third bushing securing within said internal bore of said third pole;

said fourth bushing securing over said exterior surface of said first pole;

said second pole slidably engaging within said internal bore of said first bushing for telescoping said second pole relative to said first pole;

said second bushing slidably engaging within said internal bore of said first pole for telescoping said second pole relative to said first pole;

said first pole slidably engaging within said internal bore of said third bushing for telescoping said third pole relative to said first pole;

said fourth bushing slidably engaging within said internal bore of said third pole for telescoping said third pole relative to said first pole;

said first, second and third poles are formed of a metallic material; and said first, second, third and fourth bushing are formed of a polymeric material for creating a metallic to polymeric sliding engagement between the said first and second poles and the third and first poles.

9. An extension tool as set forth in claim 5, further including a first bushing defining an internal bore, an exterior surface and extending between a first end and a second end;

a second bushing defining an internal bore, an exterior surface and extending between a first end and a second end;

a third bushing defining an internal bore, an exterior surface and extending between a first end and a second end;

a fourth bushing defining an internal bore, an exterior surface and extending between a first end and a second end;

said first bushing securing within said internal bore of said first pole;

said second bushing se wing over said exterior surface of said second pole;

said third bushing securing within said internal bore of said third pole;

said fourth bushing securing over said exterior surface of said first pole;

said second pole slidably engaging within said internal bore of said first bushing for telescoping said second pole relative to said first pole;

said second bushing slidably engaging within said internal bore of said first pole for telescoping said second pole relative to said first pole;

said first pole slidably engaging within said internal bore of said third bushing for telescoping said third pole relative to said first pole;

said fourth bushing slidably engaging within said internal bore of said third pole for telescoping said third pole relative to said first pole;

said interior bore of said first pole includes a first counterbore for receiving said first bushing; and said interior bore of said third pole includes a second counterbore fore receiving said third bushing.

10. An extension tool as set forth in claim 5, further including a first collar secured to second end of said first pole having a first pin aperture;

said first pin slidably engaging, within said first collar between a retracted position and a protruded position;

a first spring for biasing said first pin into said protruded position for extending into a selected one of said plurality of apertures of said second pole for fixing the position of said second pole relative to said first pole;
said first pin lever mounted to said first collar for moving said first pin into said retracted position for permitting displacement of said first pole relative to said second pole;
a second collar secured to second end of said third pole having a second pin aperture;
said second pin slidably engaging within said second collar between a retracted position and a protruded position;
a second spring for biasing said second pin into said protruded position for extending into a selected one of said plurality of apertures of said first pole for fixing the position of said first pole relative to said third pole; and
said second pin lever mounted to said second collar for moving said second pin into said retracted position for permitting displacement of said third pole relative to said first pole.

11. An extension tool as set forth in claim 5, further including a first collar secured to second end of said first pole having a first pin aperture,
said first pin slidably engaging within said first collar between a retracted position and a protruded position;
a first spring for biasing said first pin into said protruded position for extending into a selected one of said plurality of apertures of said second pole for fixing the position of said second pole relative to said first pole;
said first pin lever mounted to said first collar for moving said first pin into said retracted position for permitting displacement of said first pole relative to said second pole;
a second collar secured to second end of said third pole having a second pin aperture;
said second pin slidably engaging within said second collar between a retracted position and a protruded position;
a second spring for biasing said second pin into said protruded position for extending into a selected one of said plurality of apertures of said first pole for fixing the position of said first pole relative to said third pole;
said second pin lever mounted to said second collar for moving said second pin into said retracted position for permitting displacement of said third pole relative to said first pole;
said interior bore of said first pole has a substantially circular cross-section;
said exterior surface of said second pole having a substantially circular cross-section with a first chord defining a flatten portion of said substantially circular cross-section;
a first anti-rotation insert extending from said first collar into said interior bore of said first pole and positioning adjacent to said first chord for inhibiting rotation between said second pole relative to said first pole;
said interior bore of said third pole has a substantially circular cross-section;
said exterior surface of said first pole having a substantially circular cross-section with a second chord defining a flatten portion of said substantially circular cross-section; and
a second anti-rotation insert extending from said second collar into said interior bore of said third pole and positioning adjacent to said second chord for inhibiting rotation between said first pole relative to said third pole.

12. extension tool as set forth in claim 5, further including a first collar secured to second end of said first pole having a first pin aperture;
said first pin slidably engaging within said first collar between a retracted position and a protruded position;
a first spring for biasing said first pin into said protruded position for extending into a selected one of said plurality of apertures of said second pole for fixing the position of said second pole relative to said first pole;
said first pin lever mounted to said first collar for moving said first pin into said retracted position for permitting displacement of said first pole relative to said second pole;
a second collar secured to second end of said third pole having a second pin aperture;
said second pin slidably engaging within said second collar between a retracted position and a protruded position;
a second spring for biasing said second pin into said protruded position for extending into a selected one of said plurality of apertures of said first pole for fixing the position of said first pole relative to said third pole;
said second pin lever mounted to said second collar for moving said second pin into said retracted position for permitting displacement of said third pole relative to said first pole;
said interior bore of said first pole has a substantially circular cross-section;
said exterior surface of said second pole having a substantially circular cross-section with a first chord defining a flatten portion of said substantially circular cross-section;
a first ant-rotation insert extending from said first collar into said interior bore of said first pole and positioning adjacent to said first chord for inhibiting rotation between said second pole relative to said first pole;
said interior bore of said third pole has a substantially circular cross-section;
said exterior surface of said first pole having a substantially circular cross-section with a second chord defining a flatten portion of said substantially circular cross-section;
a second anti-rotation insert extending from said second collar into said interior bore of said third pole and positioning adjacent to said second chord for inhibiting rotation between said first pole relative to said third pole;
said first anti-rotation insert extending from said first collar into said interior bore of said first pole for defining, a first collar lock for securing said first collar to said first pole; and
said second anti-rotation insert extending from said second collar into said interior bore of said third pole for defining a second collar lock for securing said second collar to said third pole.

13. An extension tool as set forth in claim 5, further including a first collar secured to second end of said first pole having a first pin aperture;
said first pin slidably engaging within said first collar between a retracted position and a protruded position;
a first spring for biasing said first pin into said protruded position for extending into a selected one of said plurality of apertures of said second pole for fixing the position of said second pole relative to said first pole;
said first pin lever mounted to said first collar for moving said first pin into said retracted position for permitting displacement of said first pole relative to said second pole;

a second collar secured to second end of said third pole having a second pin aperture;

said second pin slidably engaging within said second collar between a retracted position and a protruded position;

a second spring, for biasing said second pin into said protruded position for extending into a selected one of said plurality of apertures of said first pole for fixing the position of said first pole relative to said third pole;

said second pin lever mounted to said second collar for moving said second pin into said retracted position for permitting displacement of said third pole relative to said first pole;

said interior bore of said first pole has a substantially circular cross-section;

said exterior surface of said second pole having a substantially ally circ cross-section with a first chord defining a flatten portion of said substantially circular cross-section;

a first anti-rotation insert extending from said first collar into said interior bore of said first pole and positioning adjacent to said first chord for inhibiting rotation between said second pole relative to said first pole;

said interior bore of said third pole has a substantially circular cross-section;

said exterior surface of said first pole having a substantially circular cross-section with a second chord defining a flatten portion of said substantially circular cross-section;

a second anti-rotation insert extending from said second collar into said interior bore of said third pole and positioning adjacent to said second chord for inhibiting rotation between said first pole relative to said third pole;

said first anti-rotation insert extending from said first collar into said interior bore of said first pole for defining a first bushing lock for securing said first bushing to said first pole; and said second anti-rotation insert extending from said second collar into said interior bore of said third pole for defining a second bushing lock for securing said third bushing to said third pole.

14. An extension tool comprising:

a first pole defining an interior bore with said first pole extending between a first end and a second end;

a second pole extending between a first end and a second end;

said first end of said second pole located within said first pole for positioning said second pole into said internal bore of said first pole;

said second pole having a plurality of apertures defined in said second pole;

a pin lever moving a pin between a retracted position and a protruded position;

said pin lever released for positioning said pin into said protruded position for inserting said pin into one of said plurality of apertures of said second pole for inhibiting displacement of said first pole relative to said second pole;

said pin lever depressed for positioning said pin into said retracted position for removing said pin from said plurality of apertures of said second pole for permitting displacement of said first pole relative to said second pole;

a first column and a second pin column positioned on opposing sides of the pin lever;

a bridge member extending and coupled to said first in column and said second in column; and said bridge member having a bridge bore for receiving said pin.

15. An extension tool as set forth in claim 14, including an illuminator affixed to one of said first and second poles for illuminating in proximity to said second pole; and a clamp for securing said illuminator to one of said first and second poles.

16. An extension tool as set forth in claim 14, including a holder for securing said illuminator to one of said first and second poles.

17. An extension tool as set forth in claim 14, including a first bushing defining an internal bore and an exterior surface;

a second bushing defining an internal bore and an exterior surface;

said internal bore of said first bushing slidablv engaging with said exterior surface of said second pole and with said exterior surface of said second bushing slidably engaging with said internal bore of said first pole for enabling said second pole to be slidably displaced relative to said first pole; and an upper telescoping stop comprising said first bushing cooperating with said second bushing to limit an outward movement of said second pole relative to said first pole upon engagement of said first bushing with said second bushing.

* * * * *